(12) United States Patent
Luthe et al.

(10) Patent No.: US 12,047,024 B2
(45) Date of Patent: Jul. 23, 2024

(54) DEVICE FOR DRIVING AT LEAST ONE MOVER OVER A DRIVE AREA

(71) Applicant: Beckhoff Automation GmbH, Verl (DE)

(72) Inventors: Thomas Luthe, Verl (DE); Tobias Weber, Verl (DE); Klaus Neumann, Gütersloh (DE); Alexander Weddemann, Lippstadt (DE); Hubertus Pennekamp, Gütersloh (DE); Eva Wiedner, Hövelhof (DE)

(73) Assignee: Beckhoff Automation GmbH, Verl (DE)

( * ) Notice: Subject to any disclaimer, the term of this patent is extended or adjusted under 35 U.S.C. 154(b) by 551 days.

(21) Appl. No.: 17/328,204

(22) Filed: May 24, 2021

(65) Prior Publication Data

US 2021/0281203 A1    Sep. 9, 2021

Related U.S. Application Data

(63) Continuation of application No. PCT/EP2019/082518, filed on Nov. 26, 2019.

(30) Foreign Application Priority Data

Nov. 26, 2018 (DE) ............... 10 2018 129 739.4

(51) Int. Cl.
*H02P 25/064* (2016.01)
*H02K 41/03* (2006.01)

(52) U.S. Cl.
CPC ......... *H02P 25/064* (2016.02); *H02K 41/031* (2013.01); *H02K 2201/18* (2013.01)

(58) Field of Classification Search
CPC . H02P 25/064; H02K 41/031; H02K 2201/18
(Continued)

(56) References Cited

U.S. PATENT DOCUMENTS 6,097,114 A    8/2000  Hazelton
6,316,849 B1  11/2001  Trumper et al.
(Continued)

FOREIGN PATENT DOCUMENTS

CN    1330807 A      1/2002
CN  101537932 A      9/2009
(Continued)

OTHER PUBLICATIONS

Office Action dated Jan. 6, 2022 in connection with Chinese patent application No. 201980077654.5, 7 pages Including English translation.

(Continued)

*Primary Examiner* — Zoheb S Imtiaz
(74) *Attorney, Agent, or Firm* — Dorsey & Whitney LLP

(57) ABSTRACT

A device and a method for determining a travel path for at least one mover on a drive surface, the mover comprising at least one second magnetic field generator, the device comprising a plurality of plate-shaped sectors, where the sectors comprise magnetic field generators for generating magnetic fields, and where the sectors form the drive surface. At least one virtual path network is provided on the drive surface, where a travel path for a mover is determined on the path network.

17 Claims, 10 Drawing Sheets

(58) Field of Classification Search
USPC .......................................................... 318/310
See application file for complete search history.

(56) References Cited

U.S. PATENT DOCUMENTS

| | | | |
|---|---|---|---|
| 6,339,266 | B1 | 1/2002 | Tanaka |
| 6,417,914 | B1 | 7/2002 | Li |
| 6,835,941 | B1 | 12/2004 | Tanaka |
| 7,339,289 | B2 | 3/2008 | Wang et al. |
| 8,281,888 | B2 | 10/2012 | Bergmann |
| 9,187,268 | B2 | 11/2015 | Denninger et al. |
| 9,202,719 | B2 | 12/2015 | Lu et al. |
| 9,701,487 | B2 | 7/2017 | Unterseher |
| 10,222,237 | B2 | 3/2019 | Lu |
| 10,352,953 | B2 | 7/2019 | Huber et al. |
| 10,370,195 | B2 | 8/2019 | Huber |
| 10,509,049 | B2 | 12/2019 | Sinz et al. |
| 10,669,049 | B2 | 6/2020 | Eberhardt et al. |
| 10,763,733 | B2 | 9/2020 | Lu |
| 11,855,557 | B2 | 12/2023 | Luthe et al. |
| 2005/0107909 | A1 | 5/2005 | Wynblatt et al. |
| 2008/0051984 | A1 | 2/2008 | Wurman et al. |
| 2011/0093134 | A1 | 4/2011 | Emanuel et al. |
| 2017/0163140 | A1 | 6/2017 | Lu |
| 2017/0179805 | A1 | 6/2017 | Lu |
| 2017/0179806 | A1 | 6/2017 | Lu |
| 2017/0217460 | A1* | 8/2017 | Huber ...................... B60L 13/03 |
| 2017/0344009 | A1 | 11/2017 | Wernersbach |
| 2017/0361731 | A1 | 12/2017 | Cromheecke et al. |
| 2018/0102681 | A1 | 4/2018 | Prüssmeier |
| 2018/0217174 | A1 | 8/2018 | Malinowski |
| 2018/0373255 | A1 | 12/2018 | Wernersbach |
| 2020/0223645 | A1* | 7/2020 | Feyrer ...................... B65G 54/02 |
| 2021/0273592 | A1 | 9/2021 | Luthe et al. |
| 2021/0273593 | A1 | 9/2021 | Luthe et al. |
| 2021/0278863 | A1 | 9/2021 | Luthe et al. |
| 2021/0328493 | A1 | 10/2021 | Luthe et al. |

FOREIGN PATENT DOCUMENTS

| | | |
|---|---|---|
| CN | 101779368 A | 7/2010 |
| CN | 103135640 A | 6/2013 |
| CN | 103891114 A | 6/2014 |
| CN | 104094507 A | 10/2014 |
| CN | 105307960 A | 2/2016 |
| CN | 105452812 A | 3/2016 |
| CN | 105600469 A | 5/2016 |
| CN | 106168627 A | 11/2016 |
| CN | 106716141 A | 5/2017 |
| CN | 107852082 A | 3/2018 |
| DE | 102009008529 A1 | 9/2010 |
| DE | 102006007623 B4 | 6/2015 |
| DE | 102015209610 A1 | 12/2016 |
| DE | 102017131304 A1 | 6/2019 |
| DE | 102017131314 A1 | 6/2019 |
| DE | 102017131321 A1 | 6/2019 |
| DE | 102018129727 A1 | 5/2020 |
| DE | 102018129731 A1 | 5/2020 |
| DE | 102018129732 A1 | 5/2020 |
| DE | 102018129738 A1 | 5/2020 |
| DE | 102018129739 A1 | 5/2020 |
| EP | 2047376 B1 | 8/2015 |
| EP | 3095739 A1 | 11/2016 |
| EP | 3096144 A1 | 11/2016 |
| EP | 3385803 A1 | 10/2018 |
| EP | 3868005 B1 | 6/2022 |
| JP | H03112393 A | 5/1991 |
| JP | 2000125536 A | 4/2000 |
| WO | 2013059934 A1 | 5/2013 |
| WO | 2013064656 A1 | 5/2013 |
| WO | 2015017933 A1 | 2/2015 |
| WO | 2015179962 A1 | 12/2015 |
| WO | 2015184553 A1 | 12/2015 |
| WO | 2015188281 A1 | 12/2015 |
| WO | 2016012157 A1 | 1/2016 |
| WO | 2016012160 A1 | 1/2016 |
| WO | 2016012171 A1 | 1/2016 |
| WO | 2017004716 A1 | 1/2017 |
| WO | 2018176137 A1 | 10/2018 |
| WO | 2019170488 A1 | 9/2019 |
| WO | 2020109168 A1 | 6/2020 |
| WO | 2020109180 A1 | 6/2020 |
| WO | 2020109274 A1 | 6/2020 |
| WO | 2020109276 A1 | 6/2020 |
| WO | 2020109287 A1 | 6/2020 |

OTHER PUBLICATIONS

Office Action dated Nov. 29, 2021 in connection with Chinese Patent Application No. 201980077558.3, 10 pages Including English translation.

Notification of an Objection received in connection with European patent application No. 19817165.4, dated Mar. 7, 2023, 41 pages including English translation.

Enze, Jiang et al. "Analysis of Current Distribution for Permanent Magnet Synchronous Planar Motors," Proceedings of the CSEE, vol. 31, No. 9, Mar. 25, 2011, 5 pages.

Kim, Won-jong et al. "Modeling and Vector Control of Planar Magnetic Levitator," IEEE, vol. 34, No. 6, Nov. 1998, 9 pages.

Office Action dated Dec. 24, 2021 in connection with Chinese patent application No. 201980077844.7, 10 pages Including English translation.

Office Action dated Dec. 14, 2021 in connection with Chinese patent application No. 201980077609X, 19 pages including English translation.

"Flying Motion: XPlanar," Beckhoff New Automation Technology, Nov. 1, 2018, Seiten 1-28. https://www.beckhoff.com/media/downloads/informationsmedien/beckhoff_xplanar_e.pdf.

International Search Report and Written Opinion in connection with PCT/EP2019/082536 dated Jun. 4, 2020, 25 pages including English translation.

International Search Report and Written Opinion dated Jun. 4, 2020 in connection with International Patent Application No. PCT/EP2019/082298, 25 pages including English translation.

International Search Report and Written Opinion dated Jun. 4, 2020 in connection with International Patent Application No. PCT/EP2019/082515, 29 pages including English translation.

International Search Report and Written Opinion dated Jun. 4, 2020 in connection with International Patent Application No. PCT/EP2019/082518, 25 pages including English translation.

International Search Report and Written Opinion dated Jun. 4, 2021 in connection with International Patent Application No. PCT/EP2019/082257, 25 pages including English translation.

Amato et al. "A Randomized Roadmap Method for Path and Manipulation Planning," IEEE, Apr. 1996, 8 pages.

Bortoff, Scott A. "Path Planning for UAVs" Proceedings of hte American Control Conference, Jun. 2000, 5 pages.

Bounini et al. "Modified Artificial Potential Field Method for Online Path Planning Applications," IEEE Intelligent Vehicles Symposium, Jun. 11, 2017, 7 pages.

Carbone et al. "Motion and Operation Planning of Robotic Systems: Background and Practical Approaches," Jan. 2015, 42 pages.

Correll, Nikolaus. "Introduction to Autonomous Robots," V1.7, Oct. 6, 2016, 10 pages.

Gasparetto et al. "Path Planning and Trajectory Planning Algorithms: A General Overview," 2015, 26 pages.

Gayle, et al. "Reactive deformation roadmaps: motion planning of multiple robots in dynamic environments." Proceedings of the 2007 IEEE/RSJ International Conference on Intelligent Robots and Systems, Oct. 29-Nov. 2, 2007, S. 3777-3787.

Kavraki et al. "Probabilistic Roadmaps for Path Planning in High-Dimensional Configuration Spaces," IEEE, vol. 12, No. 4, Aug. 1996, 15 pages.

Kim, et al. "Probabilistic Vehicle Trajectory Prediction over 1 Recurrent Neural Network," arxiv.org, Cornell University Library, 201 Olin Library Cor 14853, Apr. 24, 2017.

(56) References Cited

OTHER PUBLICATIONS

Le-Anh, et al. "A review of design and control of automated guided vehicle systems," European Journal of Operational Research, 171 (2006), pp. 1-23.
Nieuwenhuisen et al. "Local Multiresolution Path Planning in Soccer Games Based on Projected Intentions," Mar. 2012, 32 pages.
Padilla Cataneda et al. "Local Autonomous Robot Navigation using Potential Fields," Jun. 1, 2008, 25 pages.
Petereit et al. "Application of Hybrid A* to an Autonomous Mobile Robot for Path Planning in Unstructured Outdoor Environments," 2012.
Röfer et al. RoboCup 2011: Robot Soccer World Cup XV, Mar. 2012, 24 pages.
Tommasino et al. "'Feel the Painting': a Clinician-Friendly Approach to Programming Planar Force Fields for Haptic Devices," IEEE, 2015, 6 pages.
Trumper et al. "Design and Analysis Framework for Linear Permanent Magnet Machines," IEEE, 1994, 8 pages.
Velagapudi et al. "Decentralized prioritized planning in large multirobot teams," 2010 IEEE/RSJ International Conference on Intelligent Robots and Systems, Oct. 18, 2010, 7 pages.
Warren, Charles. "Multiple Robot Path Coordination Using Artificial Potential Fields," IEEE Conference on Robotics and Automation, May 13, 1990, 8 pages.
Zhang et al. "Probabilistic Roadmap with Self-learning for Path Planning of a Mobile Robot in a Dynamic and Unstructured Environment," IEEE, Aug. 4, 2013, 6 pages.
Translation of Chinese Publication No. CN103135640A.

\* cited by examiner

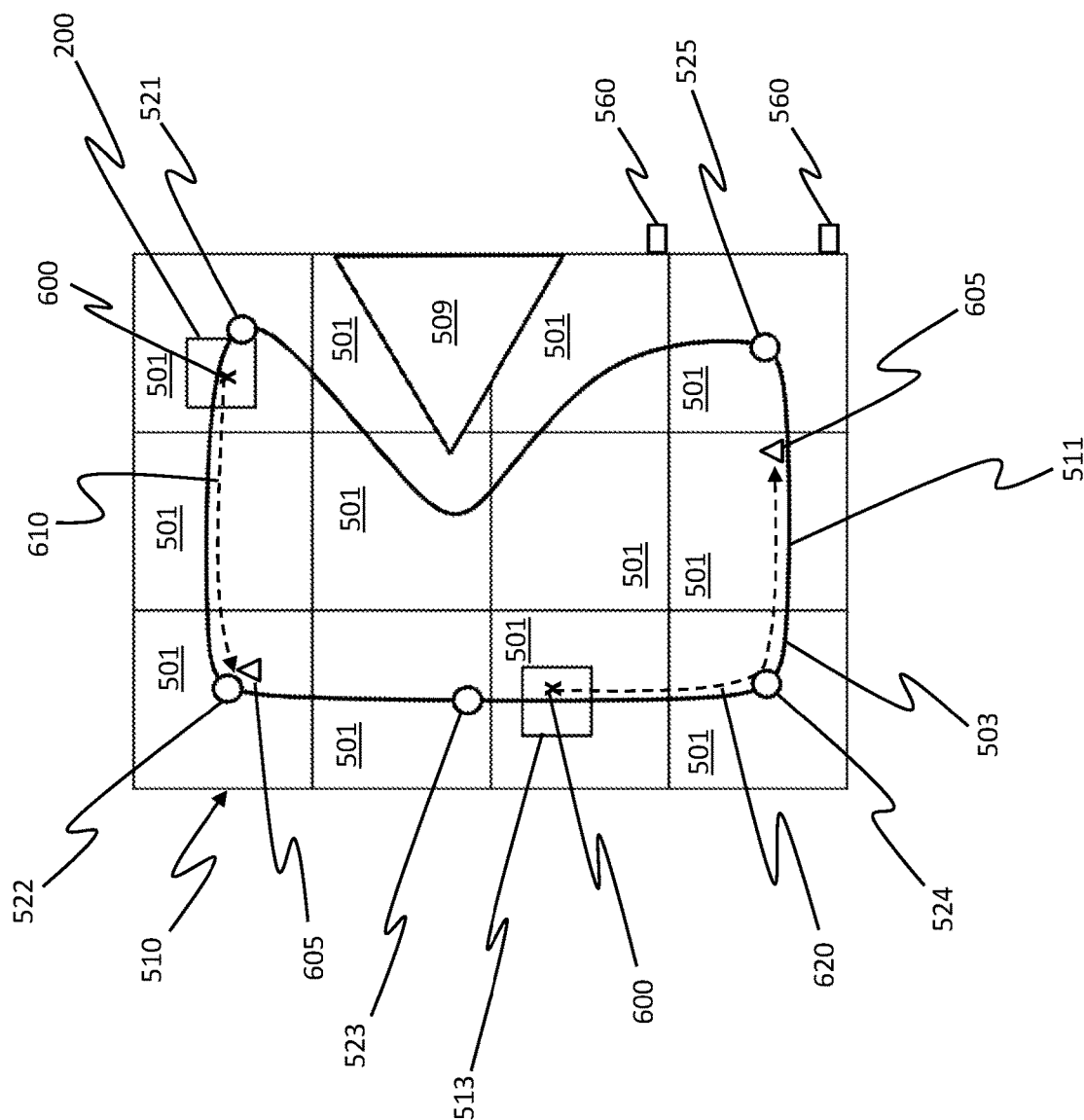
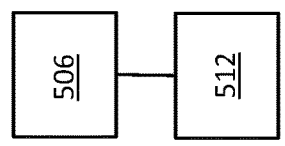
Fig. 7

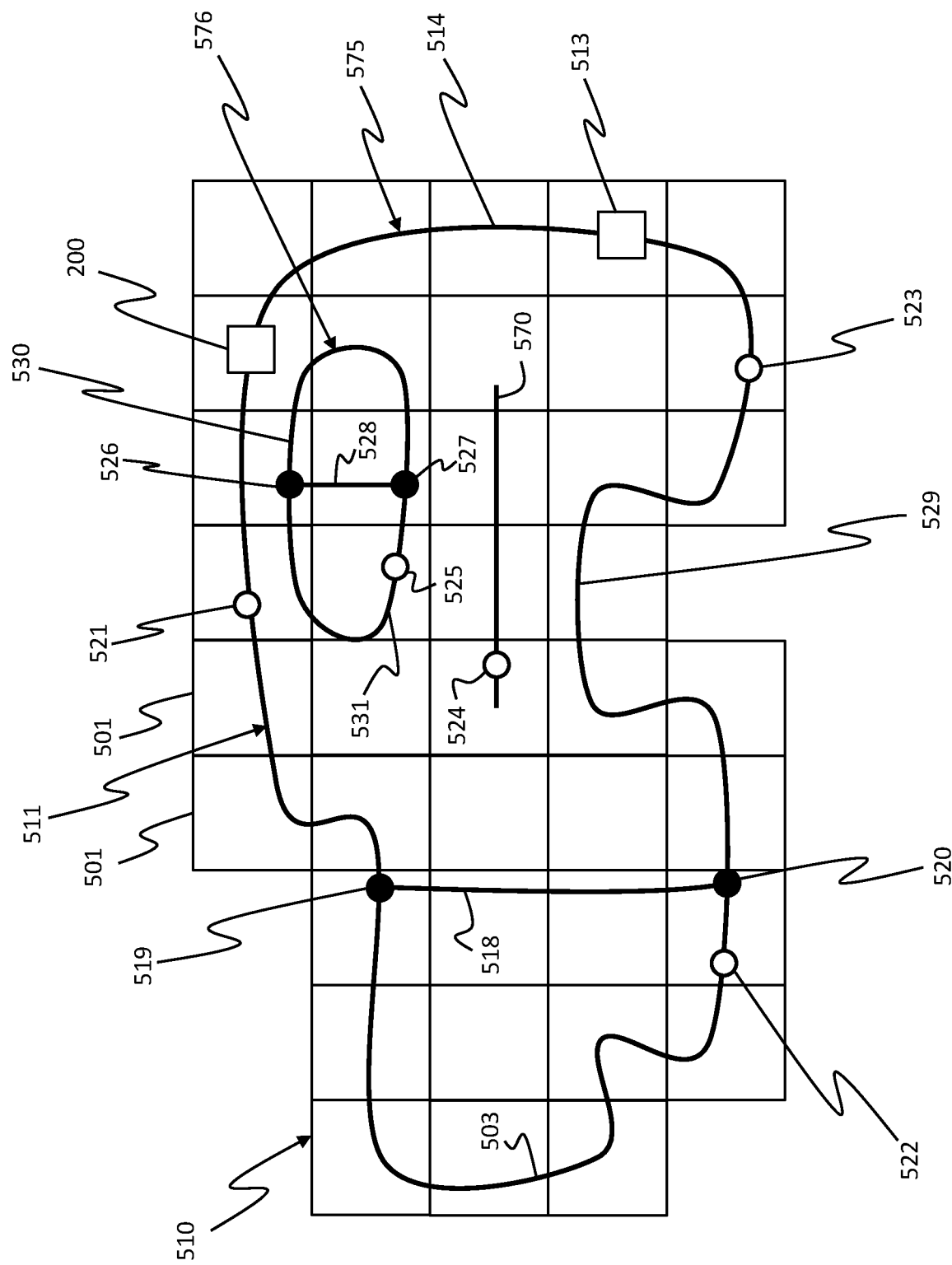
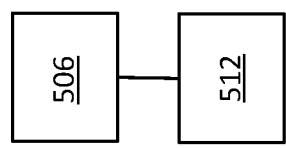
Fig. 9

DEVICE FOR DRIVING AT LEAST ONE MOVER OVER A DRIVE AREA

CROSS-REFERENCE TO RELATED APPLICATIONS

This application is a continuation of International Patent Application PCT/EP2019/082518, filed 26 Nov. 2019, "Device for Driving at Least One Mover over a Drive Area," which claims the priority of German patent application DE 10 2018 129 739.4, filed 26 Nov. 2018, "Vorrichtung zum Antreiben von wenigstens einem Mover auf einer Antriebsfläche," each of which is incorporated by reference herein, in the entirety and for all purposes.

FIELD

The present invention relates a device for driving at least one mover on a drive surface and to a method for determining a travel path.

BACKGROUND

Planar drive systems may, inter alia, be used in automation technology, in particular in manufacturing technology, handling technology and process engineering. With planar drive systems, a movable element, a so-called mover, of a system of a machine may be moved or positioned in at least two linearly independent directions. Planar drive systems may comprise a permanently energized electromagnetic planar motor with a planar stator and a rotor, i.e. the mover, movable on the stator in at least two directions.

In a permanently energized electromagnetic planar motor, a driving force is exerted on the mover by current-carrying conductors magnetically interacting with driving magnets of a magnet arrangement. The present invention relates in particular to embodiments of planar drive devices in which the drive magnets of an electric planar motor are arranged on the mover and the current-carrying conductors of the planar motor are arranged in a stationary drive surface.

EP 3 095 739 A1 discloses a device for driving at least one mover on a drive surface, wherein travel paths are calculated for the movers.

SUMMARY

The invention provides an improved device for driving a mover on a drive surface and an improved method for determining a travel path of the mover. This object of the invention is solved by the independent patent claims.

According to one aspect, a device drives at least one mover on a drive surface, the mover comprising at least one second magnetic field generator, the device comprising a plurality of plate-shaped sectors, the sectors comprising magnetic field generators, wherein said sectors form the drive surface, said sectors being connected to a control unit, said control unit being embodied to generate magnetic fields via a corresponding control of a power supply of said magnetic field generators in such a manner that the mover may be moved over the drive surface in at least one direction, at least one virtual path network being provided for the drive surface, the control unit being embodied to determine a first travel path for the mover on the path network, the control unit being embodied to actuate the magnetic field generators of the sectors with current in such a way that the mover is movable over the drive surface along the determined first travel path within the path network.

According to another aspect, a device drives at least one mover on a drive surface, the mover comprising at least one second magnetic field generator, the device comprising a plurality of plate-shaped sectors, the sectors comprising magnetic field generators, wherein said sectors form the drive surface, said sectors being connected to a control unit, said control unit being embodied to generate magnetic fields via a corresponding control of a power supply of said magnetic field generators in such a manner that the mover may be moved over the drive surface in at least one direction, at least one virtual path network being provided for the drive surface, the control unit being embodied to determine a first travel path for the mover on the path network, the control unit being embodied to actuate the magnetic field generators of the sectors with current in such a way that the mover is movable over the drive surface along the determined travel path within the path network, wherein the path network comprises at least two alternative paths at least in a contiguous part of the path network, via which a mover may be moved from its current position to a target, wherein the control unit is embodied to determine the travel path for the mover depending on operating conditions of at least one sector and/or of at least the mover in such a way that one of the two alternative paths is used as the travel path.

According to another aspect, a method determines a first travel path for at least one mover on a drive surface, the mover having at least one second magnetic field generator, the drive surface having a plurality of plate-shaped sectors, the sectors having magnetic field generators, wherein at least one virtual path network is provided for the drive surface, wherein the first travel path for the mover is determined on the path network, wherein the path network comprises at least two alternative paths at least in a contiguous part of the path network, via which a mover may be moved from its current position to a target, wherein the control unit is embodied to determine the travel path for the mover depending on operating conditions of at least one sector and/or of at least the mover in such a way that one of the two alternative paths is used as the travel path.

EXAMPLES

A device is proposed for driving at least one mover on a drive surface, said mover comprising at least a second magnetic field generator, the device comprising a plurality of plate-shaped sectors, the sectors comprising magnetic field generators, the sectors forming the drive surface, the sectors being connected to a control unit, the control unit being embodied to generate magnetic fields via a corresponding control of a power supply of the magnetic field generators in such a way that the mover may be moved over the drive surface in at least one direction, at least one virtually defined path network in particular arranged by the control unit being provided on the drive surface, the control unit being embodied to determine a travel path for the mover on the path network, in particular according to predetermined boundary conditions, the control unit being embodied to drive the magnetic field generators of the sectors with current in such a way that the mover may be moved over the drive surface along the determined travel path within the path network. The use of at least one path network simplifies the determination of the travel path.

A path network in the sense of the invention is the totality of the paths on the drive surface.

A path is defined by a one-dimensional line on the drive surface along which a mover may be moved. A path may be closed and/or have one or two open ends and/or one or two connecting points to other paths. A closed path is e.g. formed by a circle or other self-contained geometric shapes.

Connecting points are defined by the points where at least two paths meet and a mover may change from one to the other path. An open end of a path e.g. occurs in the case of a dead end which has no connecting point to other paths at one end of the path. Paths without connecting points are either closed or have two open ends.

A path network may have a plurality of paths separate from one another and/or separate, contiguous parts of the path network, and thus consists of parts of the path network. A separated path may be formed by a path which is either a closed path or has two open ends and thus has no connecting points. A contiguous part of the path network has a sum of paths which are connected by connecting points.

The terms path network and path represent tools for the determination of a travel path, these are virtual constructs that have no physical embodiments.

Along the paths of a path network, the paths of the movers may be determined. A travel path is the path that the mover has to follow to get from its current position to a target. Depending on the travel path, the limits of motion dynamics of the planar drive system, the load of the mover and/or other factors, a motion dynamics along the travel path is determined.

In an embodiment, the control unit is embodied to determine a second travel path for a second mover on the path network according to predetermined boundary conditions, wherein the control unit is embodied to drive the magnetic field generators of the sectors with current in such a way that the second mover may be moved over the drive surface along the determined second travel path within the path network, and wherein the control unit prevents a collision of the movers when determining the two travel paths.

In another embodiment, the path network comprises at least one path and/or at least two separated paths and/or at least one contiguous part of the path network.

In an embodiment, the control unit is embodied to avoid a collision of the movers, particularly at connecting points, based on predefined rules and/or priorities of the movers. Examples of these rules are known from road traffic as "right over left" or as priority rule for main roads and side roads. Another rule could be to prevent collisions by always giving priority to the mover that is first to reach the connecting point, or by regulating the priority of a mover by a clear ranking of all movers.

In an embodiment, the path network has at least two alternative paths at least in a contiguous part of the path network, via which the mover may be moved from its current position to a target, wherein the control unit is embodied to determine the travel path for the mover depending on boundary conditions and/or operating conditions in such a way that one of the two alternative paths is used as a travel path. Thus, a travel path of the mover may be changed quickly and flexibly.

In another embodiment, the path network may be changed by an input into the control unit or depending on boundary conditions and/or operating conditions of at least a sector and/or at least a mover in such a way that at least one path is changed, added to the path network or removed from the path network. This increases the flexibility of the path network.

In an embodiment, the boundary conditions are set by the dimensions of the drive surface, i.e. the positions that the movers assume at most and/or by the maximum speed and/or by the maximum acceleration and/or by the position of the movers and/or by the position of the targets and/or optimizing conditions for the travel path and/or further boundary conditions, the operating conditions being given by the temperature of part of a sector and/or by the loading of the movers and/or further operating conditions. Optimizing conditions for the travel path may be the shortest possible distance, the lowest possible energy consumption or the lowest possible travel time or further conditions. By using boundary conditions and operating conditions, an optimal utilization of the path network may be achieved and a use of the planar drive system within the specifications may be ensured.

In an embodiment, the control unit is embodied to vary the path network within predetermined limits, wherein the control unit checks, after the variation of the path network, on the basis of at least one predetermined parameter, whether the change of the path network has brought about an improvement of the parameter, wherein the control unit maintains the change of the path network if the change of the path network has brought about an improvement of the parameter, and wherein the control unit undoes the change or carries out a further change of the path network if the change has not brought about an improvement of the parameter. Corresponding parameters could e.g. be a reduction of a travel time of a mover from its current position to a target, a small number of acceleration changes during the movement of the mover along the travel path, a smallest possible number of movers within a partial area of the drive surface, a smallest possible number of connecting points along the travel path and/or further parameters which could result from an actual use of the device. In this way, the path network may be optimized or adapted.

In another embodiment, the control unit changes the path network and checks for improvement of the parameter in a simulation program, wherein the control unit changes the path network in real operation if in simulation an improvement of the parameter has resulted from the change of the path network. With the simulation, a change of the path network may be checked without disturbing the operation of the device.

In an embodiment, the control unit is embodied to determine the path network and/or a change of the path network by a self-learning procedure, in particular by a machine learning procedure and/or a neural network. Thus, an optimal adjustment of the path network may be achieved.

A method for determining a travel path for at least one mover on a drive surface is proposed, wherein the mover has at least one second magnetic field generator, wherein the device has a plurality of plate-shaped sectors, wherein the sectors have magnetic field generators, wherein the sectors form the drive surface, wherein at least one virtual path network is provided on the drive surface, wherein a travel path for a mover on the path network is determined in particular according to predetermined boundary conditions. By using the path network, the travel path for the mover may be determined with little computational effort.

In an embodiment, the magnetic field generators of the sectors are supplied with power in such a way that the mover is moved over the drive surface along the determined travel path within the path network.

In an embodiment, a second travel path for a second mover on the path network is determined according to predefined boundary conditions, wherein the magnetic field generators of the sectors are supplied with power in such a way that the second mover is moved over the drive surface along the determined second travel path within the path network, and wherein a collision of the movers is prevented when determining the two travel paths.

In another embodiment, the path network is formed by at least one path and/or at least two paths separated from each other and/or at least one contiguous part of the path network. As a result, a path network as flexible and efficient as possible is formed in order to determine travel paths in a simple manner.

In another embodiment, a collision of the movers, particularly at the connecting points, is prevented by predefined rules and/or priorities of the movers. In this case, the priorities of the movers ensure a clear ranking of the movers, which determines which mover has priority in case of a possible collision at a connecting point. Similar rules are applied for possible path collisions. This has the advantage that the movers do not collide during movement, thus avoiding damage to the movers and/or loading of the movers.

In another embodiment, the path network has at least two alternative paths at least in a contiguous part of the path network, via which the mover may be moved from its current position to a target, the travel path for the mover being determined depending on boundary conditions and/or operating conditions in such a way that one of the two alternative paths is used as a travel path. In this way, an efficient planning of the travel path may be achieved in which the boundary conditions and/or operating conditions are efficiently observed.

In another embodiment the path network may be changed by an input into the control unit or depending on boundary conditions and/or operating conditions of at least one sector and/or of at least one mover in such a way that at least one path is changed, added to the path network or removed from the path network. As a result, the path network may be adapted to changed boundary conditions and/or operating conditions to enable an efficient planning of the travel path.

In an execution the path network is varied within predetermined limits, wherein after the variation of the path network a check is carried out on the basis of at least one predetermined parameter whether the change of the path network has brought about an improvement of the parameter, wherein the change of the path network is maintained if the change of the path network has brought about an improvement of the parameter, and wherein the change is undone or a further change of the path network is carried out if the change has not brought about an improvement of the parameter.

In another embodiment, the change of the path network and the check for improvement of the parameter are carried out in a simulation program, wherein the path network is changed in real operation if in the simulation an improvement of the parameter has resulted from the change of the path network.

In another embodiment, the path network and/or a change of the path network are determined by a self-learning procedure, in particular by a machine learning procedure and/or a neural network.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 7 shows a partial section of a drive surface with a path network on which two movers move, and a control unit;

FIG. 9 shows a partial section of a further drive surface with a further path network.

DETAILED DESCRIPTION

The present invention relates to further developments of the planar drive systems disclosed in the publications WO 2013/059934 A1, WO 2015/017933 A1, WO 2015/179962 A1, WO 2015/184553 A1, WO 2015/188281 A1 and WO 2017/004716 A1. The disclosure content of the aforementioned publications is made the additional subject matter of the present description in its entirety by reference.

Furthermore, the invention relates to further developments of the planar drive systems disclosed in German patent applications 10 2017 131 304.4, 10 2017 131 314.1, and 10 2017 131 321.4, filed with the German Patent and Trademark Office on 27 Dec. 2017. The disclosure content of the German patent applications 10 2017 131 304.4, 10 2017 131 314.1, and 10 2017 131 321.4 is made the additional subject matter of the present description in its entirety by reference.

Figure 1:
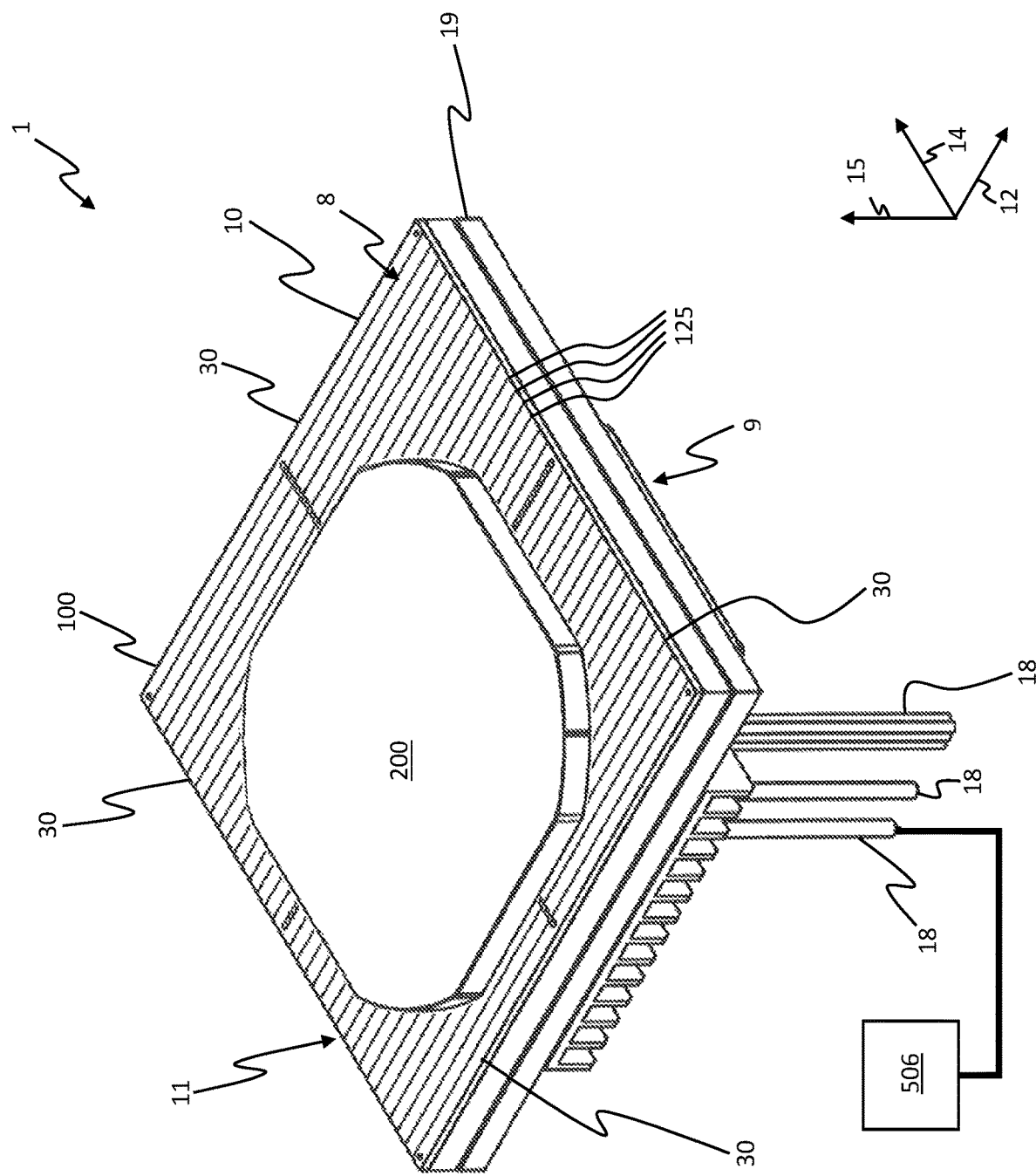
FIG. 1 shows a device for driving a mover on a drive surface.

FIG. 1 shows a device for driving at least one mover 200 on a drive surface in the form of a planar drive system 1 comprising a stator module 10 and a rotor formed by the mover 200.

The stator module 10 includes a module housing 19 and a stator assembly 100. The stator module 10 has a top side 8 and a bottom side 9 opposite the top side 8. The stator assembly 100 is arranged in a vertical direction 15 oriented from the bottom side 9 to the top side 8 above the module housing 19 and at the top side 8 of the stator module 10. The stator assembly 100 is formed as a planar stator and has a flat, i.e. planar, stator surface 11 on the upper side 8 of the stator module 10. The stator surface 11 simultaneously forms a surface of the stator module 10.

The stator surface 11 is oriented perpendicular to a vertical direction 15 and extends across the entire top surface 8 of the stator assembly 100 and the stator module 10 along directions 12 and 14. The stator assembly 100 includes at least one conductor strip 125 on the stator surface 11, to which a drive current may be applied. As shown, the stator assembly 100 may include a plurality of the conductor strips 125 on the stator surface 11. A drive current may be applied to each of the conductor strips 125 by a control unit 506. With the drive currents in the conductor strips 125, a magnetic field may be generated that drives the mover 200 in interaction with drive magnets of the mover 200. The mover 200 and the stator assembly 100 with the current-carrying conductor strips 125 form an electromagnetic planar motor. The conductor strips 125 form coil conductors of the stator assembly 100 and may also be referred to as coil conductors or as magnetic field generators 127.

During operation, the mover 200 is movably arranged above the stator surface 11 of the stator module 10 and, when operated, may be driven in a first direction 12 as well as in a second direction 14. The first direction 12 and the second direction 14 are linearly independent. In particular, the first direction 12 and the second direction 14 may be oriented perpendicularly with regard to each other, as shown in FIG. 1. The first direction 12 and the second direction 14 are each oriented in parallel to the stator surface 11 and perpendicular to the vertical direction 15. By driving the mover 200 in both the first direction 12 and the second direction 14, the mover 200 may be driven in any direction above the stator surface 11. In operation, the mover 200 may be held floating above the stator surface 11, e.g. by magnetic interaction between the drive magnets and suitable drive currents in the conductor strips 125. In addition to driving the mover 200 in the first and/or second directions 12, 14, it is also possible to drive it in the third, vertical direction 15. Furthermore, the mover 200 may also be rotated about its axis. The conductor strips represent conductor paths.

The stator surface 11 is rectangular in shape. In particular, the stator surface 11 may be square in shape, as shown. The stator surface 11 is limited by four respective straight outer edges 30. In each case, two mutually opposite outer edges 30 are oriented in parallel to the first direction 12 and two mutually opposite further outer edges 30 are oriented in parallel to the second direction 14.

An extension of the stator assembly 100 in the vertical direction 15 is smaller than an extension of the stator assembly 100 in the first and second directions 12, 14. Therefore, the stator assembly 100 forms a flat cuboid extending in the first and second directions 12, 14 or a plate extending in the first and second directions 12, 14.

Further components may be arranged at the module housing 19 or at the stator module 10 on the bottom side 9 of the stator module 10 or on the bottom side of the module housing 19. These further components extend at most to the outer edges 30 of the stator assembly 100 in the first direction 12 or in the second direction 14, so that the further components do not project beyond the outer edges 30 of the stator assembly 100 in the first or the second direction 12, 14.

Connections for connecting the stator module 10 to a plurality of connecting lines 18 are arranged on the bottom side of the module housing 19. The connecting lines 18 may e.g. comprise an input line of a data network, an output line of the data network, and a power supply line for supplying electrical power to the stator module 10. In addition, a control unit 506 may be connected to a connecting line 18. In particular, electrical power may be supplied to the stator module 10 via the power supply line to generate the drive currents. Via the data network, the stator module 10 may be connected to a control unit of the planar drive system, wherein the control unit of the planar drive system may be the control unit 506. With the data network, for example, control data for controlling the mover 200 or for controlling the targeted application of suitable drive currents to the conductor strips may be exchanged with the control unit 506.

In the first direction 12, the stator surface 11 may have an extension of between 100 mm and 500 mm, in particular between 120 mm and 350 mm, in particular of 240 mm. In the second direction 12, the stator surface 11 may have an extension of between 100 mm and 500 mm, in particular of between 120 mm and 350 mm, in particular of 240 mm. In the vertical direction 15, the stator module 10 may have an extension of between 10 mm and 100 mm, in particular of between 15 mm and 60 mm, in particular of 30 mm. In the vertical direction 15, the module housing 19 may have an extension of between 8 mm and 80 mm, in particular of between 13 mm and 55 mm, in particular of 26.6 mm. The module housing 19 may have the same extension in the first and/or second direction 12, 14 as the stator surface 11.

Figure 2:
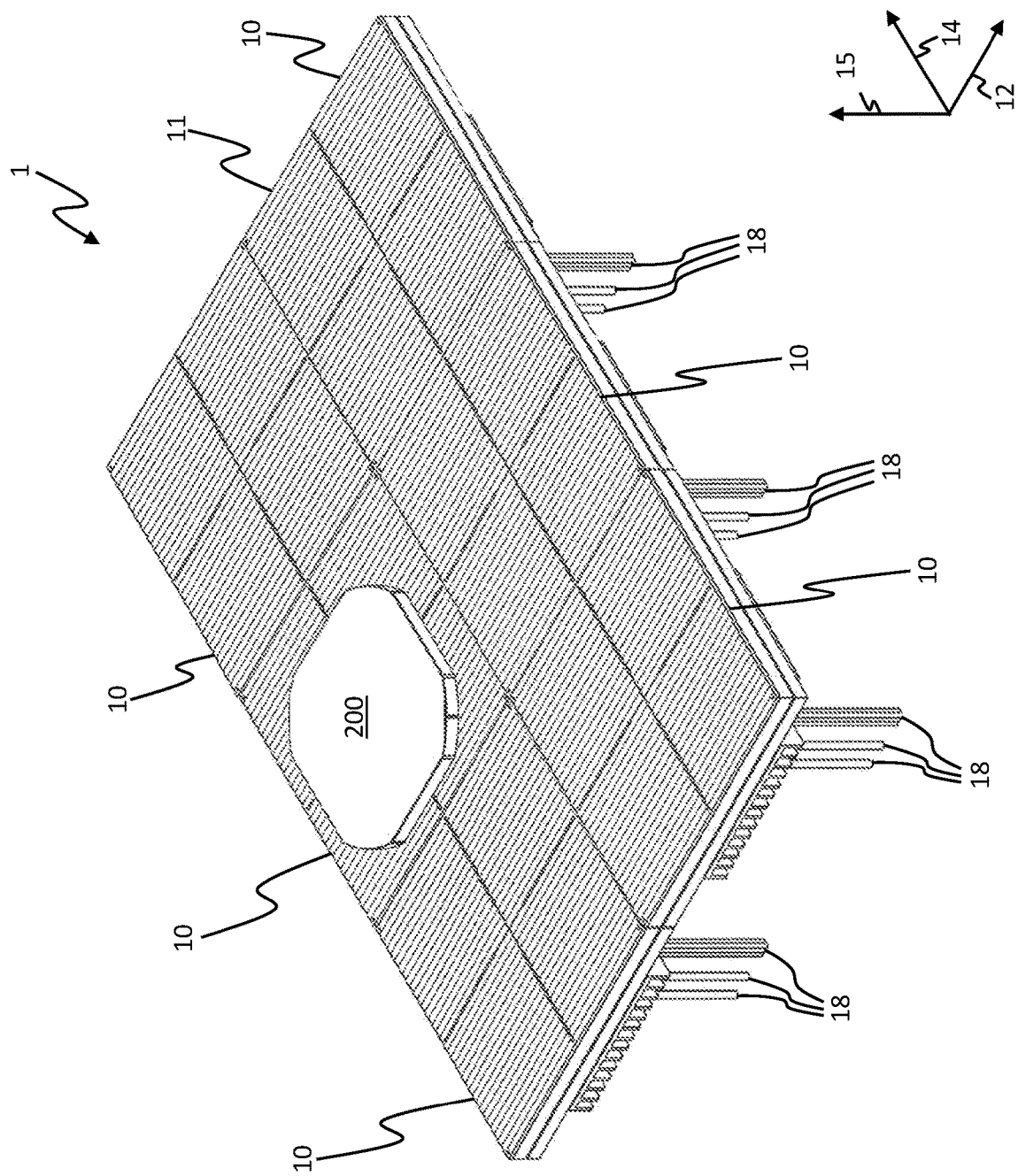
FIG. 2 shows a view of another drive system with six stator modules arranged side by side.

Multiple specimens of the stator module 10 may be arranged adjacent to each other in such a way that the outer edges 30 of adjacent stator modules 10 adjoin on one another and the stator surfaces 11 of the stator modules 10 form a contiguous drive surface over which the mover 200 may be moved without interruption, as shown in FIG. 2. Since the side surfaces of the stator module 10 are flush with the stator surface 11 at the outer edges 30, the stator surfaces 11 of two adjacent stator modules 10 may be arranged almost seamlessly adjoining each other by arranging the stator modules 10 with adjoining side surfaces of the stator assemblies 100 or adjoining outer edges 30 of the stator surfaces 11.

Adjacent stator modules 10 are each arranged adjacent to each other such that the outer edges 30 of the stator surfaces 11 of adjacent stator modules 10 adjoin on one another. As a result, the stator surfaces 11 of the stator modules 10 form a contiguous, planar drive surface for the mover 200. The mover 200 may be moved seamlessly from the stator surface 11 of one of the stator modules 10 onto or over the stator surface 11 of the adjacent stator module 10. Control signals and/or power may be supplied to each of the stator modules 10 via respective associated connecting lines 18. Alternative embodiments of the stator modules 10 may also include electrical connecting elements by which control signals and/or electrical power may be transmitted from one stator module 10 to the adjacent stator module 10. Such connecting elements may e.g. be arranged on the side surfaces of the stator modules 10. The connecting elements may be embodied as connectors or as contact surfaces that may be arranged adjoining one another.

In alternative embodiments, the stator modules 10 may also be connected to a central power supply device and/or a central control unit in a star configuration, each via their own connecting lines.

Figure 3:
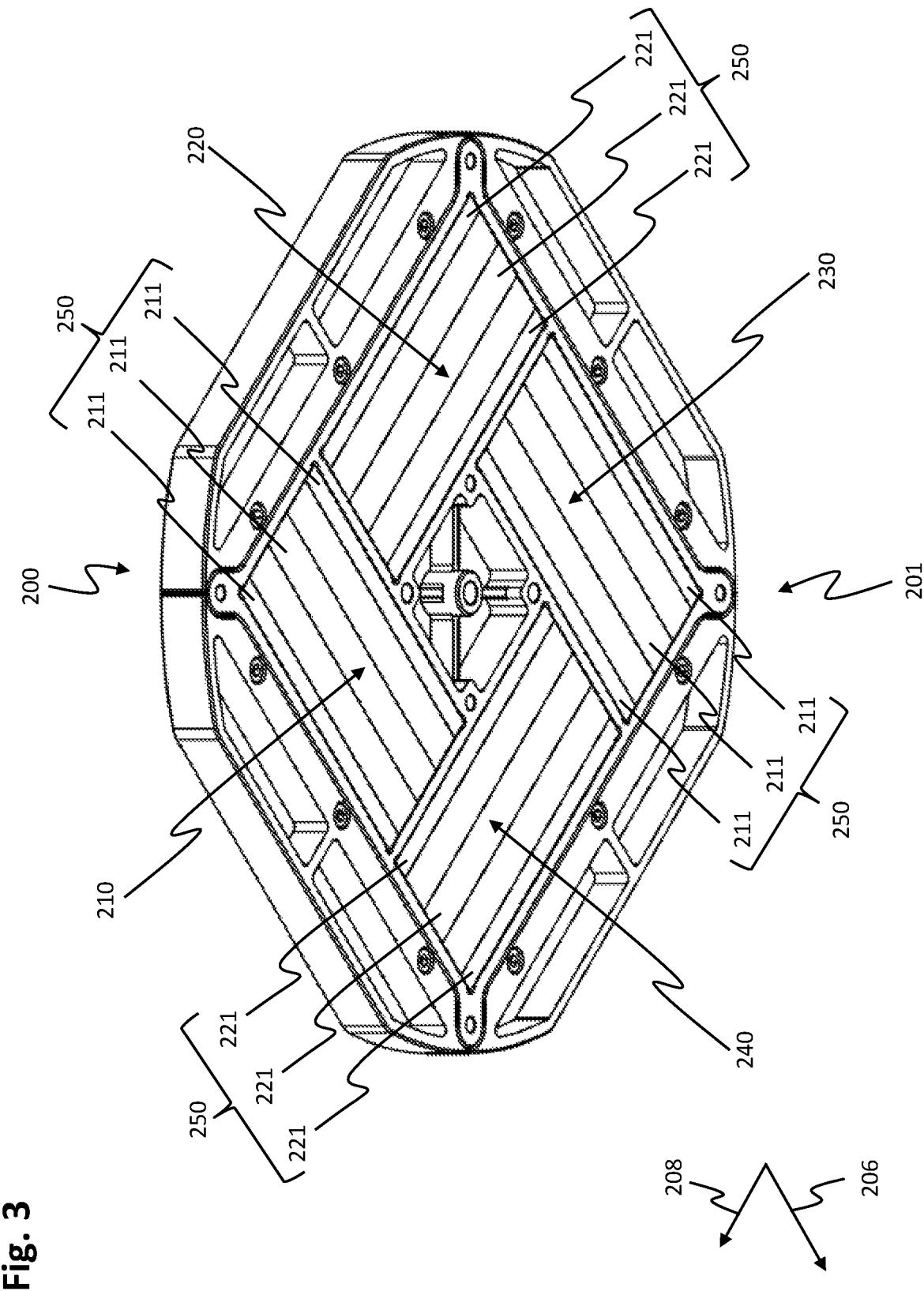
FIG. 3 shows the mover of the planar drive system having a magnet arrangement.

FIG. 3 shows the rotor, i.e. the mover 200, in a view from below onto a bottom side of the mover 200. The mover 200 comprises a magnet arrangement 201 on the bottom side. The magnet arrangement 201 is rectangular, in particular square, in shape and comprises a plurality of magnets. The bottom side of the mover 200 is flat or planar, in particular in the area of the magnets of the magnet arrangement 201. In operation, the bottom side of the mover 200 comprising the magnet arrangement 201 is essentially oriented in parallel to the stator surface 11 and is arranged facing the stator surface 11.

The magnet arrangement 201 includes a first magnet unit 210, a second magnet unit 220, a third magnet unit 230, and a fourth magnet unit 240. The first magnet unit 210 and the third magnet unit 230 each comprise drive magnets 211 extending in an elongated manner in a first rotor direction 206 and arranged side by side along a second rotor direction 208 oriented perpendicularly with regard to the first rotor direction 206. In particular, the first and third magnet units 210, 230 may each have three drive magnets 211. The second magnet unit 220 and the fourth magnet unit 240 each have further drive magnets 221 arranged side by side in the first rotor direction 206 and extending in an elongated manner along the second rotor direction 208. In operation, the first and third magnet units 210, 230 serve to drive the mover 200 in the second rotor direction 208, and the second and fourth magnet units 220, 240 serve to drive the mover 200 in the first rotor direction 206. The drive magnets 211 of the first and third magnet units 210, 230 and the further drive magnets 221 of the second and fourth magnet units 220, 240 are respectively magnetized perpendicular with regard to the first and second rotor directions 206, 208.

The drive magnets 211 and/or further drive magnets 221 represent second magnetic field generators 250. The second magnetic field generators 250 may also have other materials, functional principles and/or shapes.

Figure 4:
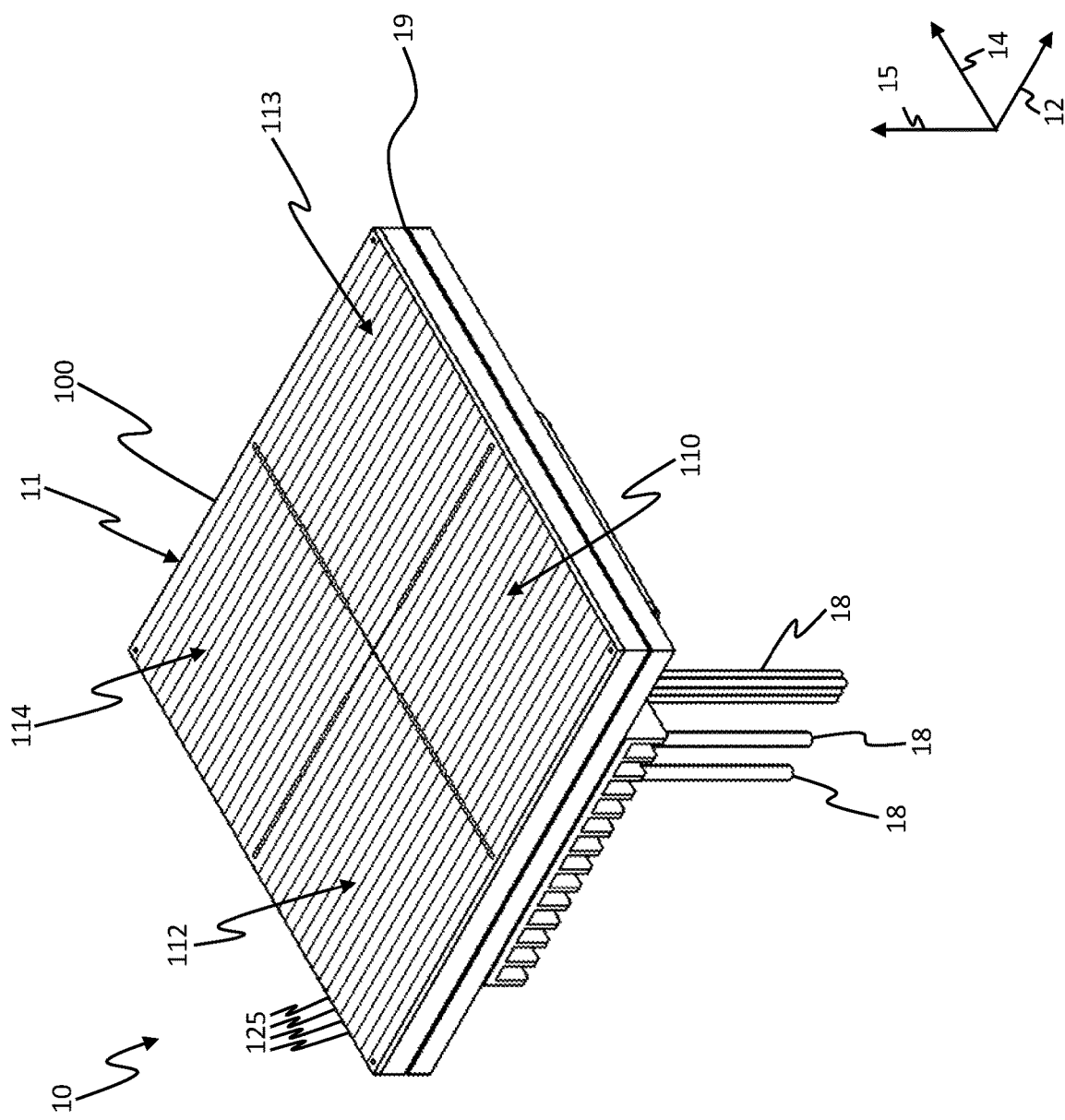
FIG. 4 shows a perspective view of a part of the drive system.

FIG. 4 shows the stator module 10 of the planar drive system 1 in a perspective view without the mover 200. The stator assembly 100 of the stator module 10 comprises a first stator sector 110, a second stator sector 112, a third stator sector 113, and a fourth stator sector 114. The stator sectors 110, 112, 113, 114 each in turn comprise a portion of conductor strips 125 disposed on the stator surface 11 of the stator assembly 100. Each of the conductor strips 125 on the stator surface 11 is arranged entirely within one of the stator sectors 110, 112, 113, 114. The stator sectors 110, 112, 113, 114 are rectangular in shape. In particular, the stator sectors 110, 112, 113, 114 may be square in shape such that an extension of the stator sectors 110, 112, 113, 114 in the first direction 12 corresponds to an extension of the stator sectors 110, 112, 113, 114 in the second direction 14.

The stator sectors 110, 112, 113, 114 each comprise a quarter of the area, i.e., a quadrant, of the stator assembly 100.

Within the stator sectors 110, 112, 113, 114, the conductor strips 125 are arranged in a plurality of stator layers or stator planes arranged on top of one another, each of the stator layers comprising only conductor strips 125 either essentially extending in an elongated manner along either the first direction 12 or essentially along the second direction 14. Apart from the extension of the conductor strips 125, and unless differences are described in the following, the stator sectors 110, 112, 113, 114 are formed identically on the different stator layers. In the stator assembly 100 of the stator module 10 shown in FIG. 4, the stator layer on the stator surface 11 comprises only conductor strips 125, which extend in an elongated manner along the first direction 12 and are arranged side by side and adjoining one another along the second direction 14.

The stator layer visible in FIG. 4 at the stator surface 11 forms a first stator layer of the stator assembly 100. In the vertical direction 15 below the first stator layer, the stator assembly 100 comprises at least one more second stator layer.

Figure 5:
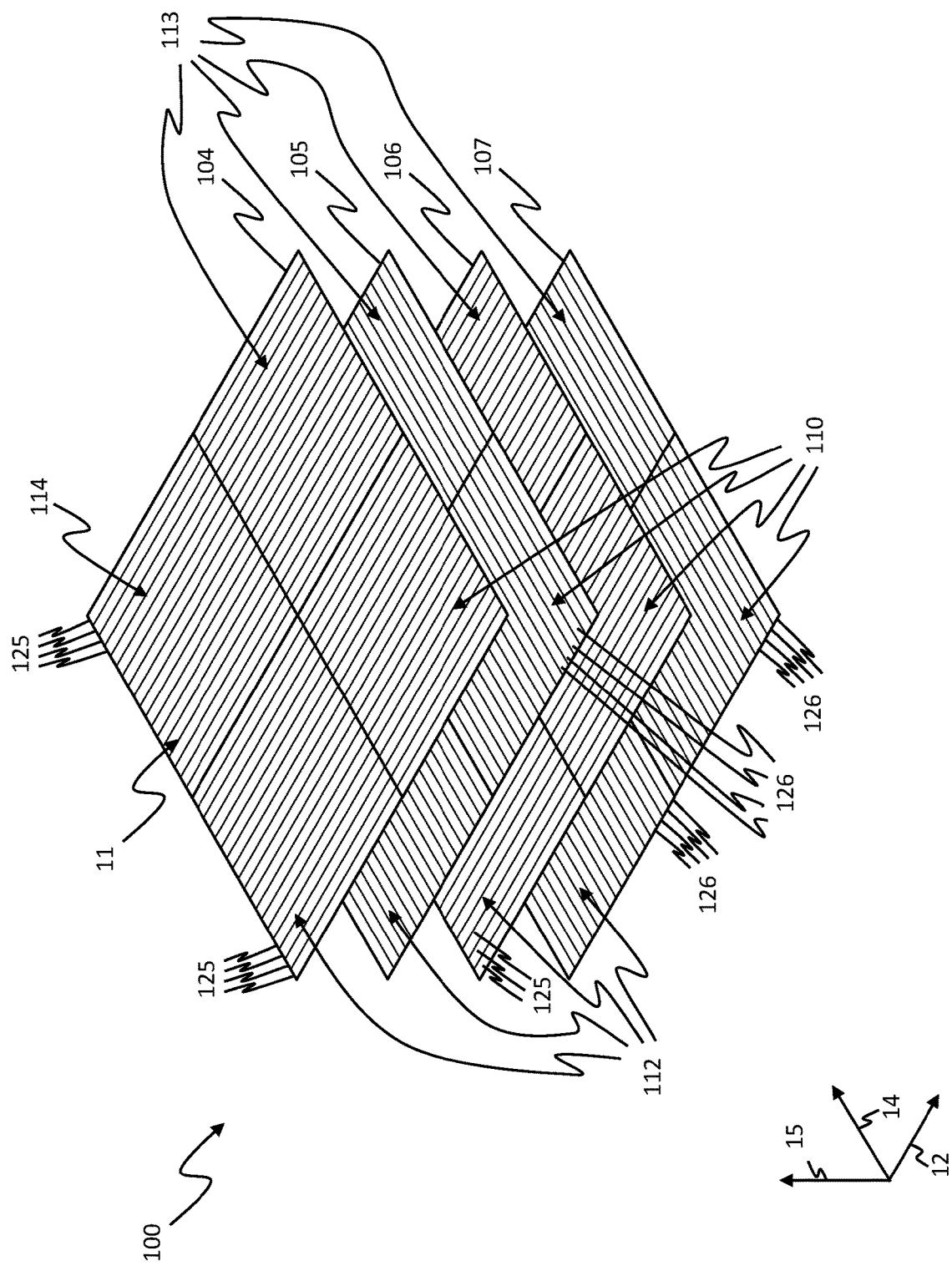
FIG. 5 shows an exploded view of a sector of the drive system with a first, second, third and fourth stator layer.

FIG. 5 shows a schematic perspective depiction of an exploded view of the stator assembly 100 with the individual stator layers.

In the vertical direction 15, the stator assembly 100 comprises a second stator layer 105 below the first stator layer 104 arranged on the stator surface 11, a third stator layer 106 below the second stator layer 105, and a fourth stator layer 107 below the third stator layer 106. Unless differences are described in the following, the second, third, and fourth stator layers 105, 106, 107 are formed like the first stator layer 104 on the stator surface 11 of the stator assembly 100 shown in FIG. 4.

In the third stator layer 106, as in the first stator layer 104, the first to fourth stator sectors 110, 112, 113, 114 comprise conductor strips 125 extending in an elongated manner along the first direction 12 and arranged side by side and adjoining one another in the second direction 14. In the second stator layer 105 and in the fourth stator layer 107, the first to fourth stator sectors 110, 112, 113, 114 comprise further conductor strips 126. Unless differences are described in the following, the further conductor strips 126 are formed like the conductor strips 125 in the first stator layer 104 and in the third stator layer 106. Unlike the conductor strips 125 of the first and third stator layers 104, 106, the further conductor strips 126 of the second and fourth stator layers 105, 107 extend in an elongated manner along the second direction 14 and are arranged side by side and adjoining one another in the first direction 12.

In the first and third stator layers 104, 106, the first to fourth stator sectors 110, 112, 113, 114 exclusively comprise the conductor strips 125 extending in an elongated manner along the first direction 12 and not additionally the further conductor strips 126 extending in an elongated manner along the second direction 14. Similarly, in the second and fourth stator layers 105, 107, the first to fourth stator sectors 110, 112, 113, 114 exclusively comprise the further conductor strips 126 extending in an elongated manner along the second direction 14 and not additionally the conductor strips 125 extending in an elongated manner along the first direction 12.

The first to fourth stator sectors 110, 112, 113, 114 each have the same dimensions in all first to fourth stator layers 104, 105, 106, 107. In particular, the first to fourth stator sectors 110, 112, 113, 114 each have the same dimensions in all first to fourth stator layers 104, 105, 106, 107 in the first direction 12 and in the second direction 14.

The conductor strips 125 and the further conductor strips 126 of first to fourth stator layers 104, 105, 106, 107 arranged on top of one another are each embodied to be electrically insulated from one another. For example, the first to fourth stator layers 104, 105, 106, 107 may each be formed as mutually insulated conductor path layers of a multi-layer printed circuit board.

The first to fourth stator sectors 110, 112, 113, 114 are embodied to be energizable independently from one another. In particular, the conductor strips 125 and the further conductor strips 126 of the first to fourth stator sectors 110, 112, 113, 114 are embodied on the stator assembly 100 to be electrically insulated from one another.

While the conductor strips 125 and the further conductor strips 126 of the individual first to fourth stator sectors 110, 112, 113, 114 on the stator assembly 100 are each embodied to be electrically isolated from the conductor strips 125 and the further conductor strips 126 of the remaining first to fourth stator sectors 110, 112, 113, 114, the conductor strips 125 and further conductor strips 126 within the individual first to fourth stator sectors 110, 112, 113, 114 may each be electrically conductively connected to one another. In particular, within each of the first to fourth stator sectors 110, 112, 113, 114, stacked conductor strips 125 of the first stator layer 104 and the third stator layer 106 may be electroconductively connected to one another. For example, respective conductor strips 125 of the first to fourth stator sectors 110, 112, 113, 114 arranged on top of one another may be connected in series. Similarly, within each of the first to fourth stator sectors 110, 112, 113, 114, further conductor strips 126 of the second stator layer 105 and the fourth stator layer 107 may be electrically conductively interconnected. For example, further conductor strips 126 of the first to fourth stator sectors 110, 112, 113, 114 arranged on top of one another may be connected in series.

Alternative embodiments of the stator assembly 100 may comprise further stator layers arranged one below the other between the second and third stator layers 105, 106 in the vertical direction 15. In this context, the stator assembly 100 may in the vertical direction 15 in each case comprise alternating stator layers having conductor strips 125 essentially extending in an elongated manner along the first direction 12 and stator layers with further conductor strips 126 essentially extending in an elongated manner along the second direction 14. In an alternative embodiment, the stator assembly 100 may in the vertical direction 15 comprise respective stator layers having conductor strips 125 essentially extending in an elongated manner along the first direction 12 and stator layers having further conductor strips 126 essentially extending in an elongated manner along the second direction 14, wherein the sum of the stator layers having conductor strips 125 essentially extending in an elongated manner along the first direction 12 and the sum of the stator layers having further conductor strips 126 essentially extending in an elongated manner along the second direction 14 have an equal mean distance from the stator surface 11. Furthermore, in alternative embodiments of the stator assembly 100, further stator layers with conductor strips 125 extending in an elongated manner along the first direction 12 or with further conductor strips 126 extending in an elongated manner along the second direction 14 may be arranged between the first and the second stator layers 104, 105 and/or between the third and the fourth stator layers 106, 107.

The conductor strips 125, 126 of the first through fourth stator sectors 110, 112, 113, 114 are respectively combined into stator segments within the first through fourth stator layers 104, 105, 106, 107.

Figure 6:
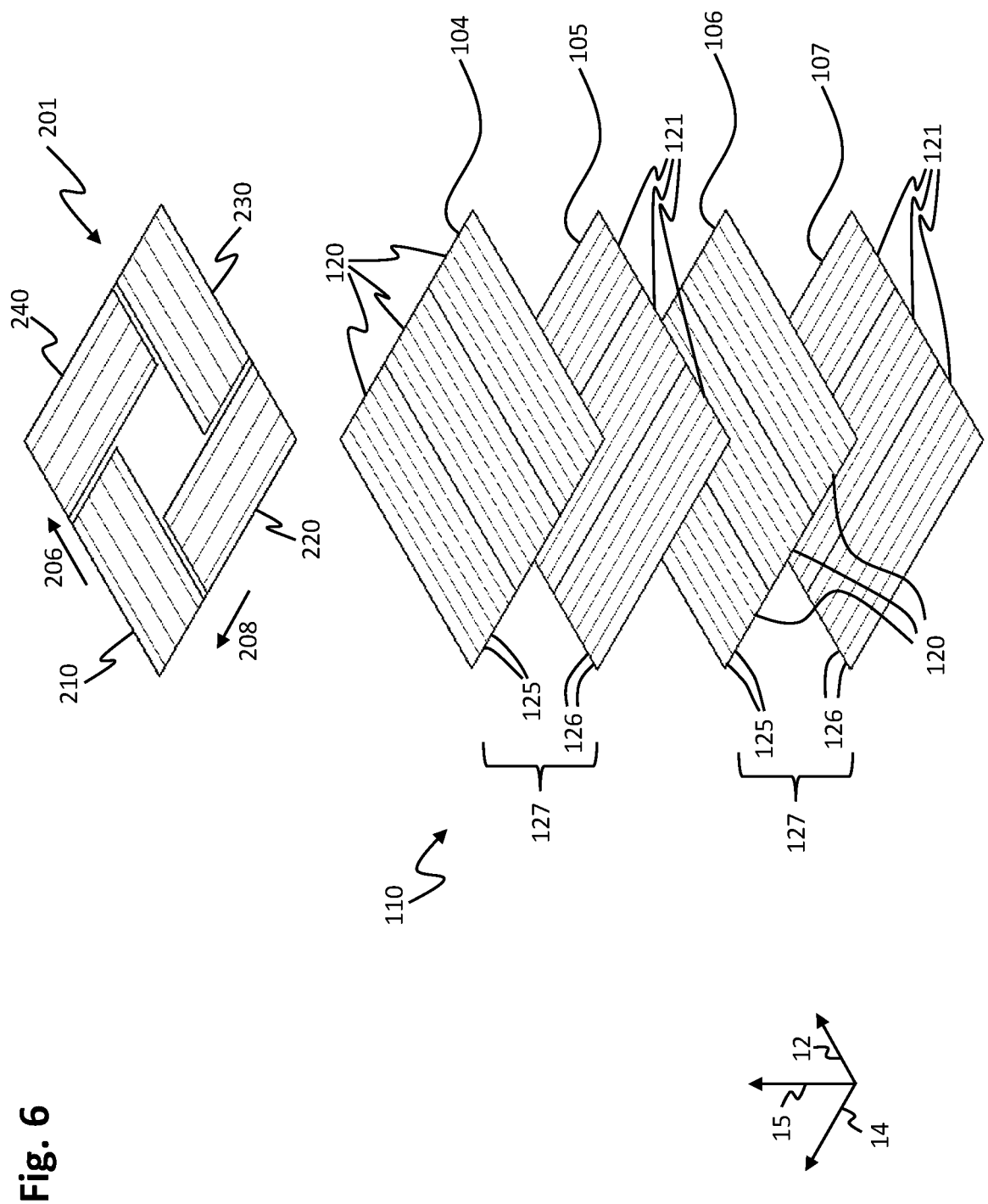
FIG. 6 shows the stator layers of the first sector of the device with individual stator segments.

FIG. 6 shows a schematic depiction of the first to fourth stator layers 104, 105, 106, 107 of the first stator sector 110 with the individual stator segments.

The conductor strips 125 and further conductor strips 126 of the first stator sector 110 are combined into stator segments 120, 121 within each of the first to fourth stator layers 104, 105, 106, 107. In each of the first to fourth stator layers 104, 105, 106, 107, the first stator sector 110 comprises three stator segments 120, 121 arranged side by side and adjoining one another. Each of the stator segments 120, 121 comprises six conductor strips 125 or further conductor strips 126 arranged side by side. The first stator sector 110 comprises three first stator segments 120 in each of the first and third stator layers 104, 106 and three second stator segments 121 in each of the second and fourth stator layers 105, 107. The first stator segments 120 each comprise six adjacent ones of the conductor strips 125 arranged side by side along the second direction 14 and extending in an elongated manner along the first direction 12, and the second stator segments 121 each comprise six adjacent ones of the further conductor strips 126 arranged side-by-side along the first direction 12 and extending in an elongated manner along the second direction 14.

Thus, in the first stator layer 104 and in the third stator layer 106, the first stator sector 110 of the stator assembly 100 exclusively comprises conductor strips 125 in an elongated manner along the first direction 12, and, in the second stator layer 105 and in the fourth stator layer 107, exclusively further conductor strips 126 in an elongated manner along the second direction 14.

The first and second stator segments 120, 121 have identical dimensions except for their orientation. In particular, the dimensions of the first stator segments 120 in the first direction 12 correspond to the dimensions of the second stator segments 121 in the second direction 14, and the dimensions of the first stator segments 120 in the second direction 14 correspond to the dimensions of the second stator segments 121 in the first direction 12.

The stator segments 120, 121 are arranged on top of one another in such a way that each of the first stator segments 120 of the first and third stator layers 104, 106 of the first stator sector 110 extends in the first direction 12 over the three second stator segments 121 of the second and fourth stator layers 105, 107 of the first stator sector 110 that are arranged side by side to one another in the first direction 12. Further, the second stator segments 121 of the second and fourth stator layers 105, 107 of the first stator sector 110 extend in the second direction 14 over all of the first stator segments 120 of the first and third stator layers 104, 106 of the first stator sector 110 that are arranged side by side to one another in the second direction 14.

The arrangement of the conductor strips 125 and further conductor strips 126 in the first to fourth stator layers 104, 105, 106, 107 of the second stator sector 112, the third stator sector 113 and the fourth stator sector 114 corresponds to the arrangement of the conductor strips 125 and further conductor strips 126 in the first to fourth stator layers 104, 105, 106, 107 of the first stator sector 110 shown in FIG. 6.

When operating the planar drive system 1, the mover 200 may be aligned over the stator assembly 100 such that the first rotor direction 206 is oriented along the first direction 12 and the second rotor direction 208 is oriented along the second direction 14. In operation, the first magnet unit 210 and the third magnet unit 230 may interact with the magnetic field generated by the conductor strips 125 of the first stator segments 120 to drive the mover 200 along the second direction 14. The second magnet unit 220 and the fourth magnet unit 240 may in operation interact with the magnetic field generated by the further conductor strips 126 of the second stator segments 121 to drive the mover 200 along the first direction 12.

Alternatively, other than shown in FIG. 6, the mover 200 may be oriented such that the first rotor direction 206 is oriented along the second direction 14 and the second rotor direction 208 is oriented along the first direction 12. In this case, the first and third magnetic units 210, 230 interact with the magnetic field of the second stator segments 121 to drive the mover 200 in the first direction 12 and the second and fourth magnetic units 220, 240 interact with the magnetic field of the first stator segments 120 to drive the mover 200 in the second direction 14.

The conductor strips 125 or further conductor strips 126 of the individual first or second stator segments 120, 121 may each be supplied with the drive currents independently of the conductor strips 125 or further conductor strips 126 of the remaining first or second stator segments 120, 121. In particular, the drive currents in one of the first or second stator segments 120, 121 do not necessarily depend on drive currents in one of the other first or second stator segments 120, 121. Furthermore, the conductor strips 125 or further conductor strips 126 of one of the first or second stator segments 120, 121 may be energized with drive currents while the conductor strips 125 or further conductor strips 126 of another, for example an adjacent, first or second stator segment 120, 121 are without current. The conductor strips 125 or further conductor strips 126 of the individual first or second stator segments 120, 121 are electrically isolated from the conductor strips 125 or further conductor strips 126 of the remaining first or second stator segments 120, 121 on the stator assembly 100. The conductor strips 125 or further conductor strips 126 of different first or second stator segments 120, 121 may e.g. be supplied with the drive currents from respective separate power modules or from separate power generation units or output stages of a power module of the stator module 10.

The conductor strips 125 or further conductor strips 126 in the individual first to fourth stator sectors 110, 112, 113, 114 may each be interconnected to form multi-phase systems with a shared neutral point. The neutral point may be formed on the stator assembly 100. In particular, the conductor strips 125 or further conductor strips 126 may be interconnected to form three-phase systems with a shared neutral point. The three-phase systems may each comprise six adjacent conductor strips 125 or six adjacent further conductor strips 126. The number of adjacent conductor strips 125 or further conductor strips 126 in one of the three-phase systems may also be three, twelve or another multiple of three in each case.

The multiphase systems may be contactable on the stator assembly 100 in such a way that each of the multiphase systems may be supplied with a drive current independently of the other multiphase systems. Alternatively, two or more of the multiphase systems may each be connected to one another on the stator assembly 100 such that a common drive current is jointly applied to each of the connected multiphase systems. For example, the connected multiphase systems on the stator assembly 100 may be connected in series or in parallel.

If the conductor strips 125 or further conductor strips 126 are interconnected to form multiphase systems, fewer contacts are required for energizing the conductor strips 125 or further conductor strips 126 than when separately energizing the individual conductor strips 125 or further conductor strips 126. This reduces the amount of hardware required for energizing the conductor strips 125 or further conductor strips 126, in particular the number of power-generating units required for energization.

The first to fourth stator sectors 110, 112, 113, 114 may each include eighteen conductor strips 125 or further conductor strips 126 in each of the first through fourth stator layers 104, 105, 106, 107, as shown in FIGS. 4 and 5. Six adjacent conductor strips 125 or further conductor strips 126 may each be interconnected to form a three-phase system, and the first to fourth stator sectors 110, 112, 113, 114 may each comprise three three-phase systems side by side in the first direction 12 and three three-phase systems arranged side by side in the second direction 14. In this regard, conductor strips 125 or further conductor strips 126, which are essentially extended in the same direction 12, 14 and are positioned on top of one another in the first to fourth stator layers 104, 105, 106, 107, may be connected in series to form a common three-phase system. The conductor strips 125 or further conductor strips 126 may thereby be connected in such a way that conductor strips 125 or further conductor strips 126 positioned on top of one another in the vertical direction 15 are each supplied with the same drive current. The three-phase systems thus have three phases which are interconnected through conductor strips 125 or further conductor strips 126 positioned on top of one another in the first to fourth stator layers 104, 105, 106, 107.

For example, in each of the individual first to fourth stator layers 104, 105, 106, 107, all conductor strips 125 or further conductor strips 126 positioned on top of one another and aligned in parallel may be connected in series. In particular, the conductor strips 125 of three-phase systems positioned on top of one another in the first stator layer 104 and in the third stator layer 106, and the further conductor strips 126 of three-phase systems positioned on top of one another in the second stator layer 105 and in the fourth stator layer 107 may each be connected in series to form a shared three-phase system. Thereby, all conductor strips 125 or further conductor strips 126 of the first and third stator layers 104, 106 and of the second and fourth stator layers 105, 107 which are positioned on top of one another in the vertical direction 15 and oriented in parallel may be connected in series.

In particular, in the stator assembly 100 within the individual stator segments 120, the conductor strips 125 extending in an elongated manner along the first direction 12 are each connected to form multiphase systems with a shared neutral point. In this case, the individual multiphase systems of different stator segments 120 may each be energized independently of one another. Similarly, all further conductor strips 126 of the individual further stator segments 121 are each connected to form further multiphase systems. The individual further multiphase systems of the further stator segments 121 may each be supplied with current independently of one another and independently of the multiphase systems of the stator segments 120. In particular, the conductor strips 125 of the stator segments 120 and the further conductor strips 126 of the further stator segments 121 are each connected to form three-phase systems. A three-phase drive current may be applied to each of the conductor strips 125 and the further conductor strips 126. The drive currents comprise a first phase U, a second phase V and a third phase W, each having a phase offset of 120° with regard to one another.

The conductor strips 125 are spatially offset in the second direction 14 by in each case one third of the effective wavelength of the drive magnets 211 of the first and third magnet units 210, 230 interacting with the conductor strips 125. The further conductor strips 126 are arranged spatially offset in the first direction 12 by in each case one third of the effective further wavelength of the further drive magnets 221 of the second and fourth magnet units 220, 240 interacting with the further conductor strips 126.

The conductor strips 125 and the further conductor strips 126 represent electric magnetic field generators 127. The magnetic field generators 127 may also have other materials, functional principles and/or shapes.

The mover 200 represents the moving element, thus the rotor of the device and comprises elements for generating a magnetic field, in particular magnets or permanent magnets, which are referred to as second magnetic field generators 250. The magnetic field of the mover 200, with the variable magnetic field of the stator assembly 100 generated by the magnetic field generators 127, ensures that the mover 200 is moved over the stator assembly 100, so that in particular an air gap is formed between the stator assembly 100 and the mover 200.

FIG. 7 shows a schematic depiction of a section of a drive surface 510 in a top view. The drive surface 510 may be formed by a plurality of stator modules 10 of the planar drive system 1 described in FIGS. 1 to 6. However, other types of planar drive systems may also be used which use magnetic fields to move a mover 200 on a drive surface 510. Twelve sectors 501 are shown. A sector 501 may be formed by a stator module 10 of FIGS. 1 to 6. In the embodiment example, sectors 501 have the shape of squares. Depending on the chosen embodiment, sectors 501 may also have other shapes such as rectangles or triangles etc. For example, a sector 501 may have a size ranging from 150 mm×150 mm up to 240 mm×240 mm. Depending on the chosen embodiment, a sector 501 may also have other sizes. Furthermore, the sectors 501 may also have different sizes.

In addition, a mover 200 and a second mover 513 are arranged on the drive surface 510. The mover 200 is e.g. embodied as a mover 200 as described in FIGS. 1 to 3. The mover 200 may have a square, round or rectangular shape or other shapes. For example, mover 200 may have a size ranging from 100 mm×100 mm to 200 mm×200 mm. The mover 200 may have a thickness in the range of 8 mm to 20 mm. The drive surface 510 and the mover 200 may be embodied to move the mover 200 at a speed of e.g. 1 m/s to 6 m/s. The drive surface 510 and mover 200 may be embodied to move the mover 200 at an acceleration of up to 30 m/s$^2$ or more. The mover 200 may also be embodied to carry a load of up to 1.5 kg or more. In addition, mover 200 may be embodied to move at a distance from the drive surface 510 of up to 6 mm or more. The second mover 513 may be identical to the mover 200.

In addition, an object 509 is arranged on the drive surface 510 which e.g. represents an obstacle and must therefore always be avoided. The control unit 506 is connected to a data memory 512 and is directly or indirectly connected to magnetic field generators 127 of the sectors 501. In addition, the control unit 506 is connected to sensors 560 of the drive surface 510, which e.g. detect a current position of the mover 200 and/or the second mover 513 and transmit it to the control unit 506. In addition, the control unit 506 may store information on planned or calculated positions of the mover 200 and the second mover 513, calculated values for the speeds of the mover 200 and the second mover 513, calculated values for the accelerations of the mover 200 and the second mover 513, calculated values for movement directions of the mover 200 and the second mover 513 and/or calculated values for the jolt of the mover 200 and the second mover 513 in a data memory 512.

On the drive surface 510, a path network 511 with a path 503 referred to as first path 503 in the following, is shown in the form of a continuous line. The path 503 is closed in this embodiment and does not have any connecting point to other paths. On the closed path 503, a first, a second, a third, a fourth and a fifth station 521, 522, 523, 524, 525 are shown in the form of circles. The first to fifth stations 521, 522, 523, 524, 525 represent positions where a load or, respectively, a product transported by the mover 200 or the second mover 513 may be processed. Depending on predefined data which are stored for example in the data memory 512, the control unit 506 determines at which first to fifth station 521, 522, 523, 524, 525 the mover 200 and/or the second mover 513 stops and/or picks up a load and/or delivers a load and/or the load is processed by further machines. The first path 503 defines a path on which the movers 200, 513 may be moved by the control unit 506. The first path network 511 and the first to fifth stations 521, 522, 523, 524, 525 are stored in the data memory 512. Depending on a target 605 for the respective mover 200, 513 which are stored in the data memory 512, depending on the path network 511 and depending on further boundary conditions and/or operating conditions, the control unit 506 may determine a first travel path 610 for the mover 200 and a second travel path 620 for the second mover 513. These first and second travel paths 610, 620 determine the respective movement of the movers 200, 513 on the first path 503 of the path network 511. For a better representation, both the targets 605 and the first and second travel paths 610, 620 are shown slightly next to path 503, although the first and second travel paths 610, 620 define a movement of the movers 200, 513 on path 503.

Figure 8:
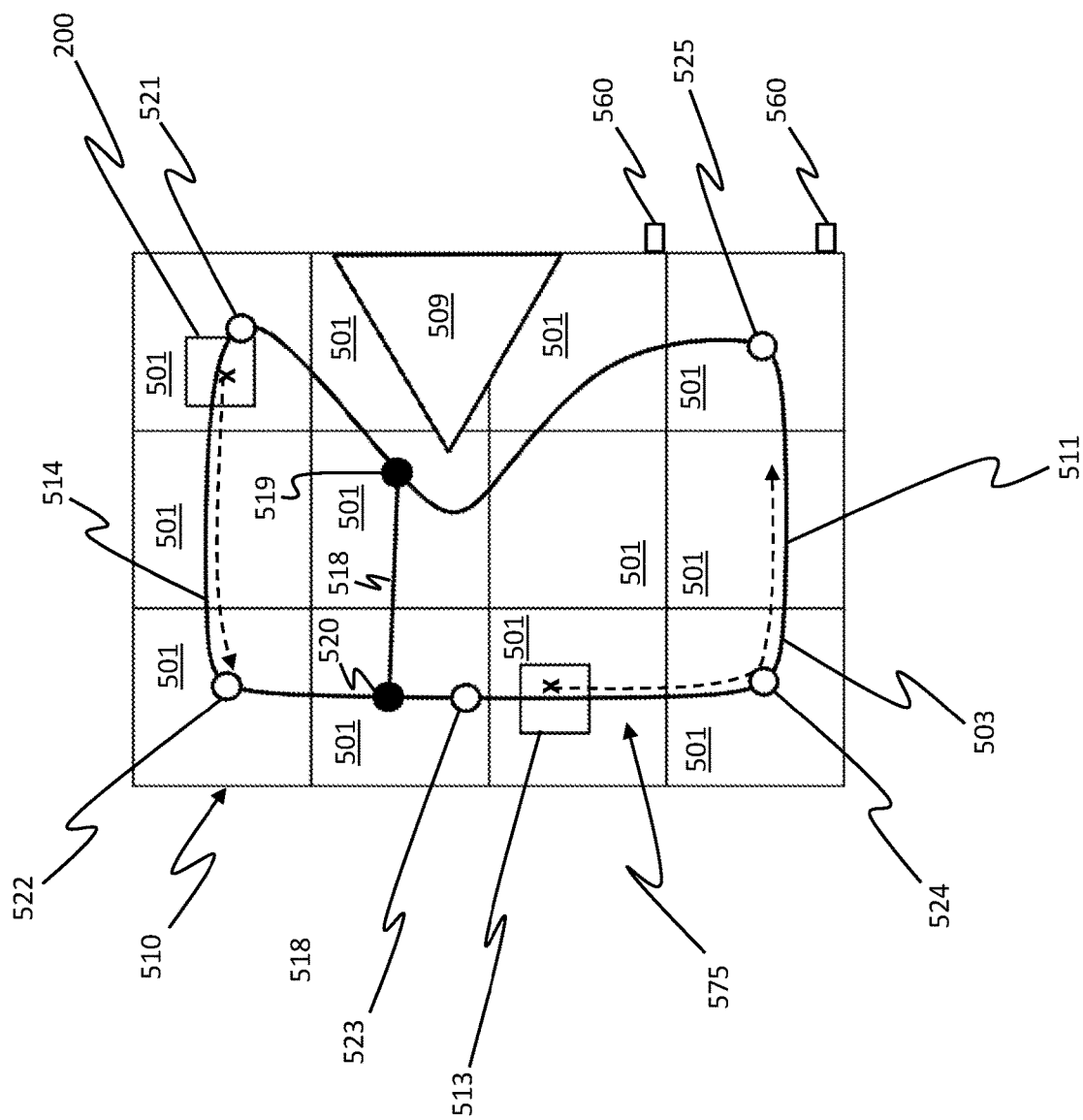
FIG. 8 shows a partial section of a drive surface with a further embodiment of the path network.

In a schematic depiction, FIG. 8 shows a top view of a section of a drive surface 510 according to FIG. 7, wherein in this embodiment the path network 511 comprises the first path 503, a second path 518, and a third path 514. The second path 518 is connected at a first connecting point 519 with a first end to the first path 503. In addition, the second path 518 is connected to a second end at a second connecting point 520 of the first path 503. The third path 514 is also connected at the first connecting point 519 with a first end to the first path 503 and thus also to the second path 518. In addition, the third path 514 is also connected with a second end at a second connecting point 520 of the first path 503 and the second path 518. The first path 503, the second path 518 and the third path 514 thus form a first contiguous part 515 of the path network 511.

The path network 511 may have been changed from its embodiment according to FIG. 7 to its embodiment according to FIG. 8 by an input into the control unit 506 or depending on boundary conditions and/or operating conditions. The change of path network 511 is characterized by the fact that the second path 518 has been added. As a result, a part of the first path 503 has been split off and has become the third path 514. In this embodiment, too, the data on the first path network 511 with the first path 503, the second path 518, the third path 514 and the connecting points 519, 520 are stored in data memory 512. This means that the control unit 506 has a larger path network 511 available for the planning of the first and second paths 610, 620 of the movers 200, 513 compared to the design as shown in FIG. 7. The reason for the change of the path network 511 may be an operating condition such as the temperature of the sectors 501 over which the third path 514 extends. If this temperature is too high for the further operation of the respective sectors 501, the second path 518 may be used as an alternative for the movers 200, 513, which do not have to approach the first and second stations 521, 522. In this way, an alternative travel path via the second path 518 may be used and the sectors 501 via which the third path 514 runs may cool down. Other reasons for adding the second path 514 may e.g. be to create a shortcut or a parking area or a path for an overtaking between mover 200 and the second mover 513.

The control unit 506 is embodied to carry out dynamic planning after defining the first or second travel path 610, 620 of the mover 200, 513. Dynamic planning determines which magnetic field generators 127 are energized on sectors 501 in order to move the movers 200, 513 along the first or second travel path 610, 620 at a desired speed. Depending on various operating parameters, the control unit 506 may move the movers 200, 513 only via the first path 503 or additionally via the second path 518. For this purpose, the control unit 506 actuates the magnetic field generators 127 of sectors 501 in a corresponding manner. In order to determine on which first or second travel path 610, 620 the first and/or the second mover 200, 513 are moved by the control unit 506, corresponding rules, priorities and boundary conditions are stored in the data memory 512.

For example, depending on the loading of the movers 200, 513, it may be sufficient if the movers 200, 513 only approach the first, second and third stations 521, 522, 523. It is thus appropriate to move the movers 200, 513 back to the first station 521 via the second path 518 after the third station 523. In addition, due to the loading of the movers 200, 513, it may be necessary to move the mover 200 and/or the second mover 513 to the fourth and fifth stations 524, 525, as well. With this boundary condition, the second path 518 is not used by the control unit 506 for moving the movers 200, 513. Furthermore, the second path 518 may be used by the control unit 506 to e.g. park the mover 200 in the second path 518 while the second mover 513 continues to move on the first path 503 and/or the third path 514. In this way, overtaking maneuvers may be carried out. The mover 200 parked on the second path 518 may accordingly be moved back to the first path 503 or the third path 514 after the second mover 513 has passed.

FIG. 9 shows a schematic top view of a further arrangement of sectors 501 forming a drive surface 510. In this embodiment, an outer edge contour of the drive surface 510 has a stepped shape. In addition, a path network 511 with different parts is schematically shown. A part of the path network 511 consists of a single, separate path 570. The separate path 570 has no connecting point to another path and thus has two open ends.

Another part of the path network is formed by the first contiguous part 575 of the path network 511 comprising the first path 503, the second path 518 and the third path 514. The first path 503 is connected to the second path 518 and the third path 514 via the first connecting point 519 and via the second connecting point 520. Thus, the second path 518 and the third path 514 are also connected via the first connecting point 519 and via the second connecting point 520.

A second contiguous part 576 of the path network 511 consists of a fourth path 528, a fifth path 530 and the sixth path 531. The fourth path 528, the fifth path 530 and the sixth path 531 are connected via a third connecting point 526 and a fourth connecting point 527. The first contiguous part 575 of path network 511, the second contiguous part 576 of path network 511 and the separate path 570 are each separated from one another and do not have shared connecting points. Furthermore, a mover 200 is shown on the third path 514. In addition, a second mover 513 is also on the third path 514. Furthermore, various first to fifth stations are arranged on the different paths. In this embodiment, as well, the data on the path network 51 is stored in the data memory 512. As may be seen from FIG. 9, various forms of the path network 511 may be defined for the movement of the movers 200, 513 in the data memory 512.

Figure 10:
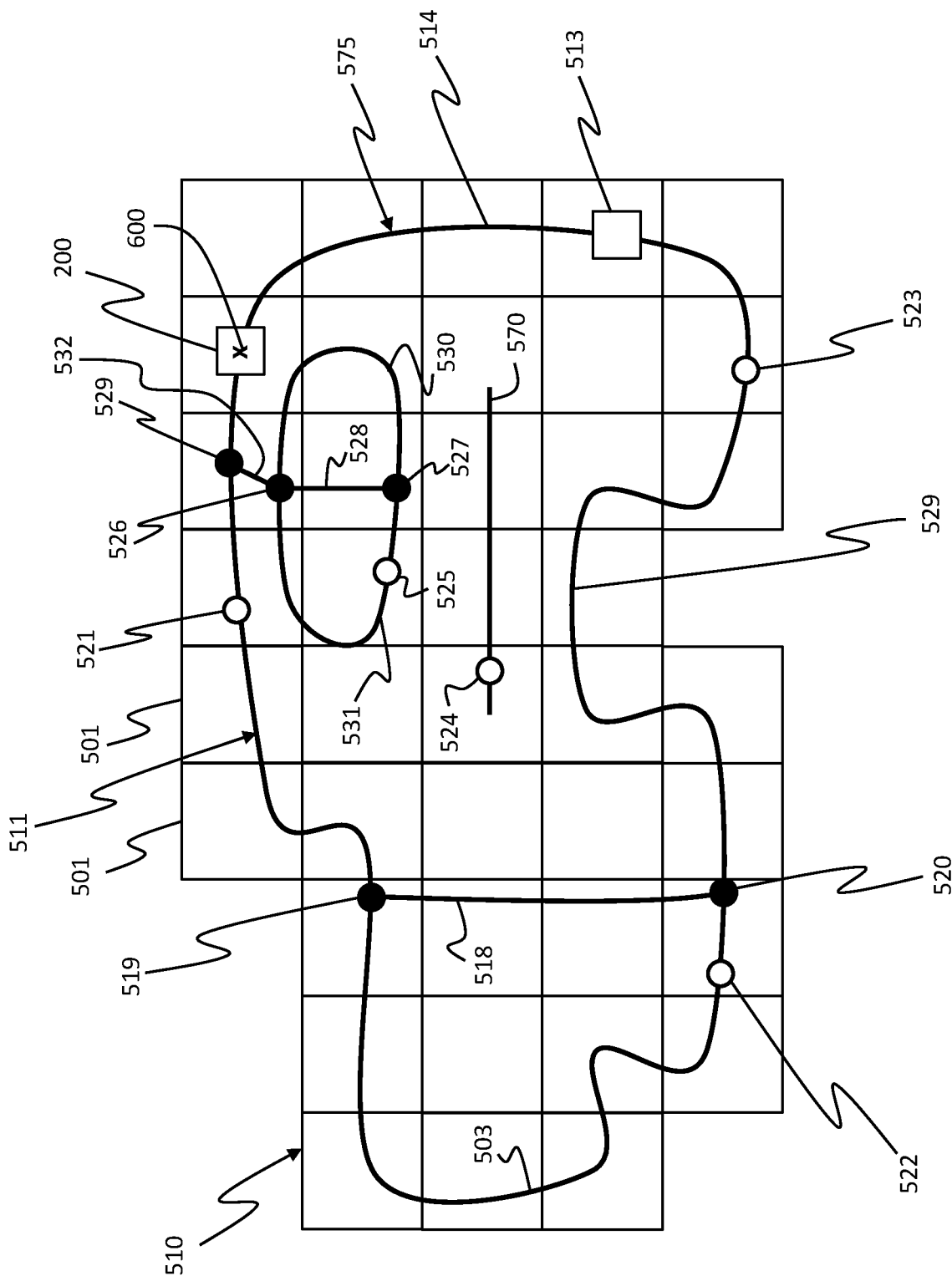
FIG. 10 shows a partial section of a further drive surface with a further path network.

FIG. 10 shows another embodiment with a view onto a drive surface 510, wherein a path network 511 is shown. The drive surface 510 is composed of a large number of sectors 501. The path network 511 of the embodiment according to FIG. 10 differs from the embodiment according to FIG. 9 in that a seventh path 532 has been added. The seventh path 532 is connected to the first contiguous part 575 of path network 511 shown in FIG. 9 via a fifth connecting point 529 and to the second contiguous part 576 of path network 511 shown in FIG. 9 via the third connecting point 526. Thus, the first contiguous part 575 of the path network 511 shown in FIG. 9 and the second contiguous part 576 of the path network 511 shown in FIG. 9 are connected via the seventh path 532 as shown in FIG. 10 and form a shared contiguous part 575 of path network 511. By adding the fifth connecting point 529, the third path 514 has been divided into a third path 514, which extends between the second connecting point 520 and the fifth connecting point 529, and an eighth path 533, which extends between the fifth connecting point 529 and the first connecting point 519.

The information about the path network 511 is stored in the data memory 512. In addition, a first, a second, a third, a fourth and a fifth station 521, 522, 523, 524, 525 are schematically shown in the form of circles on the drive surface 510. The first to fifth connecting points 519, 520, 526, 527, 529 simultaneously represent intersections of the paths. At these intersections, a collision of the movers 200, 513 must be avoided according to predefined rules and/or priorities of movers 200, 513. The control unit 506 plans the movement of the movers 200, 513 accordingly at the first to fifth connecting points 519, 520, 526, 527, 529.

The path network 511 may have been changed from its embodiments according to FIG. 9 to the embodiment according to FIG. 10 by an input into the control unit 506 or depending on boundary conditions and/or operating conditions. The change of path network 511 is characterized by the fact that the seventh path 532 has been added. As a result of this change, the fifth station 525 may be reached by the mover 200 via the seventh path 532 and, for example, via the sixth path 531, in contrast to the embodiment of the path network according to FIG. 9. A reason for adding the seventh path 532 may be a changed boundary condition due to the loading of the mover 200. An example would be that the mover 200 has loaded a product at the third station 523, which is to be processed next at the fifth station 525. Other reasons for adding the seventh path 532 may be to create a parking area where a mover may be parked without blocking paths used by other movers.

The control unit 506 may also be embodied to e.g. move the mover 200 from its current position 600 via the third path 514, the eighth path 533, the second path 518 and the first path 503 or alternatively via the third path 514, the eighth path 533 and the first path 503 to the second station 522, if, for example, the second station 522 is to be approached by the mover 200. Depending on the boundary conditions and/or operating conditions, the control unit 506 may thus select either the second path 518 or the first path 503, which is an alternative to the second path 518, to move the mover 200 from the current position 600 to the second station 522. The first path 503 and the second path 518 essentially both lead towards the second station 522, at least partially or completely crossing different sectors 501. If, for example, the check of the temperature of the sectors 501 over which the first path 503 is routed reveals that these sectors 501 have a temperature that exceeds a predefined limit value, the control unit 506 may select the second path 518 instead of the first path 503 for travel path planning. In this way, it is possible to reduce or avoid a current flow to the sectors 501 of the first path 503, thus reducing the heat loss in the sectors 501 used by the mover 200 on the first path 503 and thus lowering the temperature of the sectors 501.

In addition, depending on the chosen embodiment, the fifth path 530 may be used as a parking area for unneeded movers 200, 513 by the control unit 506, and the unneeded mover(s) 200, 513 may be moved to the fifth path 530.

In addition, the control unit 506 may be embodied to change the path network 511 by an input into the control unit 506, for example by an operator or another control unit, or depending on boundary conditions or operating conditions of the drive surface 510 and/or the movers 200, 513.

Depending on the selected design, a path of the path network 511 is embodied as a one-dimensional motion path. Thus, only one mover 200, 513 may be located or moved at one path position.

In another embodiment, the control unit 506 is embodied to vary the path network 511 within predefined limits. For example, individual path sections or shapes of path sections or paths may be varied according to given boundary conditions which are e.g. stored in the data memory 512. After changing the path network 511, the control unit 506 checks whether a given parameter has been improved by the variation of the path network 511. The given parameter may e.g. be a length of a path, a power consumption for moving the movers 200, 513 or a time period for travelling to predefined stations. If the check shows that at least one of the given parameters has improved due to the variation of the path network 511, the variation is maintained unless the deterioration of other parameters argues against it. The data memory may contain e.g. limit values, especially percentage limit values for the parameters, above which a change of the path network is maintained. Furthermore, limit values may be stored for several parameters, wherein the limit values determine at which change of the parameters a change of the path network is maintained.

If, however, the check reveals that the at least one given parameter has not been improved by the change of the path network, the change of path network 511 is either undone or another change of path network 511 is carried out. In case of a further change of the path network 511, it is checked afterwards whether the at least one given parameter has improved. If the check shows that the given parameter has improved, the further change is maintained. If, however, the check reveals that the given parameter has not improved, either the further change is undone or an additional change of the 511 path network is carried out.

Depending on the chosen embodiment, the variation of the path network 511 may either be executed in real operation or in a simulation using a simulation program. If the simulation shows that the change of the path network according to the simulation leads to an improvement of at least a predefined parameter, the control unit 506 carries out the change of the path network 511 in real operation. However, if the simulation shows that the change of the path network 511 does not lead to an improvement of the parameter, the change of the path network 511 is not carried out in real operation.

Depending on the chosen embodiment, the control unit 506 may be embodied to determine at least a path network 511 and/or a change of the path network 511 using a self-learning procedure, in particular a machine learning procedure. In addition, the control unit may have a neural network to determine the path network 511 and/or a change of the path network 511.

With the described method, the amount of data that must be taken into account in travel path planning is significantly reduced. Thus, a better scalability of the system is provided even for a larger number of movers.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

TABLE 1

List of reference numerals: 1-240

1 planar drive system
8 top side
9 bottom side
10 stator module
11 stator surface
12 first direction
14 second direction
15 vertical direction
18 connecting line
19 module housing
30 Outer edge of stator surface
100 stator assembly
104 first stator layer
105 second stator layer
106 third stator layer TABLE 1-continued List of reference numerals: 1-240

107 fourth stator layer
110 first stator sector
112 third stator sector
113 second stator sector
114 fourth stator sector
120 first stator segments
121 second stator segments
125 conductor strips
126 further conductor strips
200 mover
201 magnet arrangement
206 first rotor direction
208 second rotor direction
210 first magnet unit
211 drive magnet
220 second magnetic unit
221 further drive magnet
230 third magnet unit
240 fourth magnet unit

TABLE 2

List of reference numerals: 501-620

501 sector
502 first mover
503 first path
506 control unit
509 object
510 drive surface
511 first path network
512 data memory
513 second mover
514 third path
517 second path network
518 second path
519 first connecting point
520 second connecting point
521 first station
522 second station
523 third station
524 fourth station
525 fifth station
526 third connecting point
527 fourth connecting point
528 fourth path
529 fifth connecting point
530 fifth path
531 first connecting path
532 second connecting path
533 path section
560 sensor
570 path
575 first contiguous part
576 second contiguous part
600 current position
605 target
620 travel path

The invention claimed is:

1. A device for driving at least one mover on a drive surface, the mover comprising at least one second magnetic field generator, the device comprising:
a plurality of plate-shaped sectors, the sectors comprising magnetic field generators, wherein said sectors form the drive surface,
said sectors being connected to a control unit, and
said control unit being configured to generate magnetic fields via a corresponding control of a power supply of said magnetic field generators in such a manner that the mover is moved over the drive surface in at least one direction, at least one virtual path network being provided for the drive surface, wherein the virtual path network has at least two alternative paths at least in a contiguous part of the virtual path network, the two alternative paths being connected via a connecting point;

the control unit being configured to determine a first travel path for the mover on the virtual path network depending on boundary conditions and/or operating conditions such that one of the two alternative paths is used as the first travel path, and the control unit being configured to actuate the magnetic field generators of the sectors with current such that the mover is movable over the drive surface along the determined first travel path within the virtual path network.

2. The device according to claim 1, wherein:
the control unit is configured to determine a second travel path for a second mover on the path network, and
wherein the control unit is configured to actuate the magnetic field generators of the sectors with current such that the second mover is moved over the drive surface along the determined second travel path within the path network, and the control unit avoiding a collision of the movers when determining the two travel paths.

3. The device according to claim 1, wherein the control unit is configured to avoid a collision of the movers at the connecting points by predetermined rules and/or priorities of the movers.

4. The device according to claim 1, wherein the path network is changed by an input into the control unit or depending on boundary conditions and/or operating conditions of at least one sector and/or at least one mover such that at least one path is changed, added to the path network or removed from the path network.

5. The device according to claim 1, wherein the control unit is configured to vary the path network within predetermined limits,
wherein the control unit, after the variation of the path network, checks on the basis of at least one predetermined parameter whether the variation of the path network has brought about an improvement of the parameter,
wherein the control unit maintains the change of the path network if the change of the path network has brought an improvement of the parameter, and
wherein the control unit undoes the change or performs another change of the path network if the change has not brought an improvement of the parameter.

6. The device according to claim 1, wherein the control unit is configured to determine a first travel path for the mover on the path network according to predetermined boundary conditions.

7. The device according to claim 1, wherein the path network and/or a change in the path network are determined by a self-learning method or a machine learning method and/or a neural network.

8. A device for driving at least one mover on a drive surface, the mover comprising at least one second magnetic field generator, the device comprising:
a plurality of plate-shaped sectors, the sectors comprising magnetic field generators, wherein said sectors form the drive surface,
said sectors being connected to a control unit, and
said control unit being configured to generate magnetic fields via a corresponding control of a power supply of said magnetic field generators in such a manner that the mover is moved over the drive surface in at least one direction, at least one virtual path network being provided for the drive surface;
the control unit being configured to determine a first travel path for the mover on the virtual path network, and
the control unit being configured to actuate the magnetic field generators of the sectors with current such that the mover is movable over the drive surface along the determined travel path within the virtual path network;
wherein the virtual path network comprises at least two alternative paths at least in a contiguous part of the virtual path network, via which a mover is moved from its current position to a target, the two alternative paths being connected via a connecting point; and
wherein the control unit is configured to determine the travel path for the mover depending on operating conditions of at least one sector and/or of at least the mover such that one of the two alternative paths is used as the travel path.

9. The device according to claim 8, wherein:
the control unit is configured to determine a further travel path for a further mover on the path network, and
wherein the control unit is configured to actuate the magnetic field generators of the sectors with current such that the further mover is moved over the drive surface along the determined further travel path within the path network, and the control unit avoiding a collision of the movers when determining the two travel paths.

10. The device according to claim 9, wherein:
a contiguous part of the path network comprises a sum of paths that are connected via connecting points, wherein the connecting points are points where at least two paths meet, and
wherein the control unit is configured to avoid a collision of the movers at the connecting points by predetermined rules and/or priorities of the movers.

11. The device according to claim 8, wherein the path network is changed by an input into the control unit or depending on boundary conditions and/or operating conditions of at least one sector and/or at least one mover such that at least one path is changed, added to the path network or removed from the path network.

12. The device according to claim 8, wherein the control unit is configured to vary the path network within predetermined limits,
wherein the control unit, after the variation of the path network, checks on the basis of at least one predetermined parameter whether the variation of the path network has brought about an improvement of the parameter,
wherein the control unit maintains the change of the path network if the change of the path network has brought an improvement of the parameter, and
wherein the control unit undoes the change or performs another change of the path network if the change has not brought an improvement of the parameter.

13. A method for determining a first travel path for at least one mover on a drive surface,
the mover having at least one second magnetic field generator, and
the drive surface having a plurality of plate-shaped sectors, the sectors having magnetic field generators;
wherein at least one virtual path network is provided for the drive surface,
wherein the first travel path for the mover is determined on the path network, wherein the path network comprises at least two alternative paths at least in a contiguous part of the path network, via which a mover is moved from its current position to a target, wherein the control unit is configured to determine the travel path for the mover depending on operating conditions of at least one sector and/or of at least the mover such that one of the two alternative paths is used as the travel path, wherein the virtual path network is varied within predetermined limits, wherein after the variation of the virtual path network a check is carried out on the basis of at least one predetermined parameter whether the change of the path network has brought about an improvement of the parameter, wherein the change of the path network is maintained if the change of the virtual path network has brought about an improvement of the parameter, and wherein the change is reversed or a further change of the path network is carried out if the change has not brought about an improvement of the parameter.

14. The method according to claim 13, wherein:
a further travel path for a further mover on the path network is determined according to predetermined boundary conditions, and wherein the magnetic field generators of the sectors are supplied with current in such a manner that the further mover is moved over the drive surface along the determined further travel path within the path network, and a collision of the movers is avoided when the two travel paths are determined.

15. The method according to claim 13, wherein the path network is changed by an input to the control unit or depending on boundary conditions and/or operating conditions of at least one sector and/or at least one mover such that at least one path is changed, added to the path network or removed from the path network.

16. The method according to claim 13, wherein:
the change of the path network and the check of the improvement of the parameter are carried out in a simulation program, and wherein the control unit carries out the change of the path network in real operation if in the simulation an improvement of the parameter has resulted from the change of the path network.

17. The method according to claim 13, wherein the path network and/or a change in the path network are determined by a self-learning method or a machine learning method and/or a neural network.

* * * * *